(12) United States Patent
Fay et al.

(10) Patent No.: US 7,162,314 B2
(45) Date of Patent: Jan. 9, 2007

(54) SCRIPTING SOLUTION FOR INTERACTIVE AUDIO GENERATION

(75) Inventors: Todor J. Fay, Bellevue, WA (US); Brian L. Schmidt, Bellevue, WA (US); Forrest P. Trepte, Bellevue, WA (US); David G. Yackley, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 941 days.

(21) Appl. No.: 10/092,945

(22) Filed: Mar. 5, 2002

(65) Prior Publication Data

US 2002/0161462 A1    Oct. 31, 2002

Related U.S. Application Data

(60) Provisional application No. 60/273,589, filed on Mar. 5, 2001.

(51) Int. Cl.
*G06F 17/00* (2006.01)
*G06F 3/00* (2006.01)
*G06F 9/00* (2006.01)

(52) U.S. Cl. .......................... 700/94; 715/704
(58) Field of Classification Search ............... 700/94; 715/704; 717/704; 84/604, 602, 600; 710/107
See application file for complete search history.

(56) References Cited

U.S. PATENT DOCUMENTS

| | | |
|---|---|---|
| 5,142,961 A | 9/1992 | Paroutaud |
| 5,303,218 A | 4/1994 | Miyake |
| 5,315,057 A | 5/1994 | Land et al. |
| 5,331,111 A | 7/1994 | O'Connell |
| 5,483,618 A | 1/1996 | Johnson et al. |
| 5,511,002 A | 4/1996 | Milne et al. |
| 5,548,759 A | 8/1996 | Lipe |
| 5,565,908 A | 10/1996 | Ahmad |
| 5,717,154 A | 2/1998 | Gulick |
| 5,734,119 A | 3/1998 | France et al. |
| 5,761,684 A | 6/1998 | Gibson |
| 5,768,545 A | 6/1998 | Solomon et al. |
| 5,778,187 A | 7/1998 | Monteiro et al. |
| 5,792,971 A | 8/1998 | Timis et al. |
| 5,842,014 A | 11/1998 | Brooks et al. |
| 5,852,251 A | 12/1998 | Su et al. |
| 5,890,017 A | 3/1999 | Tulkoff et al. |
| 5,902,947 A | 5/1999 | Burton et al. |
| 5,942,707 A | 8/1999 | Tamura |

(Continued)

OTHER PUBLICATIONS

Wippler, Jean-Claude; "Scripted Documents"; Proceedings of the 7th USENIX Tcl/TKConference; Austin Texas; Feb. 14-18, 2000; The USENIX Association.

(Continued)

*Primary Examiner*—Sinh Tran
*Assistant Examiner*—Andrew C Flanders
(74) *Attorney, Agent, or Firm*—Lee & Hayes, PLLC

(57) ABSTRACT

A script file includes a text section that has a text label to designate a point during execution of the script sequence when an audio rendition of a video event is to be initiated. The script file also includes a container that maintains audio content within the script file. The audio content is identified in the container with a content label that corresponds to a text label in the text section. The audio content is initiated to be generated as the audio rendition at the designated point during execution of the script sequence when the script file is executed and when a script processor determines that the content label corresponds to the text label.

47 Claims, 8 Drawing Sheets

U.S. PATENT DOCUMENTS

| | | | |
|---|---|---|---|
| 5,977,471 | A | 11/1999 | Rosenzweig |
| 5,990,879 | A * | 11/1999 | Mince .................... 715/500.1 |
| 6,044,408 | A | 3/2000 | Engstrom et al. |
| 6,100,461 | A | 8/2000 | Hewitt |
| 6,152,856 | A | 11/2000 | Studor et al. |
| 6,160,213 | A | 12/2000 | Arnold et al. |
| 6,169,242 | B1 | 1/2001 | Fay et al. |
| 6,173,317 | B1 | 1/2001 | Chaddha et al. |
| 6,175,070 | B1 | 1/2001 | Naples et al. |
| 6,180,863 | B1 | 1/2001 | Tamura |
| 6,216,149 | B1 | 4/2001 | Conner et al. |
| 6,225,546 | B1 | 5/2001 | Kraft et al. |
| 6,233,389 | B1 | 5/2001 | Barton et al. |
| 6,301,603 | B1 | 10/2001 | Maher et al. |
| 6,357,039 | B1 | 3/2002 | Kuper |
| 6,433,266 | B1 | 8/2002 | Fay et al. |
| 6,541,689 | B1 | 4/2003 | Fay et al. |
| 6,628,928 | B1 | 9/2003 | Crosby et al. |
| 6,640,257 | B1 | 10/2003 | MacFarlane |
| 6,658,309 | B1 | 12/2003 | Abrams et al. |
| 2001/0053944 | A1 | 12/2001 | Marks et al. |
| 2002/0108484 | A1 | 8/2002 | Arnold et al. |
| 2002/0144587 | A1 | 10/2002 | Naples et al. |
| 2002/0144588 | A1 | 10/2002 | Naples et al. |

OTHER PUBLICATIONS

A. Camurri et al., "A Software Architecture for Sound and Music Processing", Microprocessing and Microprogramming vol. 35 pp. 625-632 (Sep. 1992).

Berry M., "An Introduction to GrainWave" Computer Music Journal Spring 1999 vol. 23 No. 1 pp. 57-61.

H. Meeks, "Sound Forge Version 4.0b", Social Science Computer Review vol. 16, No. 2, pp. 205-208(Summer 1998).

Harris et al.; "The Application of Embedded Transputers in a Professional Digital Audio Mixing System"; IEEE Colloquium on "Transputer Applications"; Digest No. 129, 2/ 1-3 (uk Nov. 13, 1989).

J. Piche et al., "Cecilia: A Production Interface to Csound", Computer Music Journal vol. 22, No. 2 pp. 52-55 (Summer 1998).

M. Cohen et al., "Multidimensional Audio Window Management", Int. J. Man-Machine Studies vol. 34, No. 3 pp. 319-336 (1991).

Malham et al., "3-D Sound Spatialization using Ambisonic Techniques" Computer Music Journal Winter 1995 vol. 19 No. 4 pp. 58-70.

Meyer D., "Signal Processing Architecture for Loudspeaker Array Directivity Control" ICASSP Mar. 1985 vol. 2 pp. 16.7.1-16.7.4.

Miller et al., "Audio-Enhanced Computer Assisted Learning and Computer Controlled Audio-Instruction". Computer Education, Pergamon Press Ltd., 1983, vol. 7 pp. 33-54.

Moorer, James; "The Lucasfilm Audio Signal Processor"; Computer Music Journal, vol. 6, No. 3, Fall 1982, 0148-9267/82/030022-11; pp. 22 through 32.

R. Dannenberg et al., "Real-Time Software Synthesis on Superscalar Architectures", Computer Music Journal vol. 21, No. 3 pp. 83-94 (Fall 1997).

Reilly et al., "Interactive DSP Debugging in the Multi-Processor Huron Environment" ISSPA Aug. 1996 pp. 270-273.

Stanojevic et al., "The Total Surround Sound (TSS) Processor" SMPTE Journal Nov. 1994 vol. 3 No. 11 pp. 734-740.

V. Ulianich, "Project FORMUS: Sonoric Space-Time and the Artistic Synthesis of Sound", Leonardo vol. 28, No. 1 pp. 63-66 (1995).

Vercoe, Barry; "New Dimensions in Computer Music"; Trends & Perspectives in Signal Processing; Focus, Apr. 1982; pp. 15 through 23.

Vercoe, et al; "Real-Time CSOUND: Software Synthesis with Sensing and Control"; ICMC Glasgow 1990 for the Computer Music Association; pp. 209 through 211.

Waid, Fred; "APL and the Media"; Proceedings of the Tenth APL as a Tool of Thought Conference; held at Stevens Institute of Technology, Hoboken, New Jersey, Jan. 31, 1998 pp. 111 through 122.

Bargen, et al., "Inside DirectX", Microsoft Press, 1998, pp. 203-226.

* cited by examiner

SCRIPTING SOLUTION FOR INTERACTIVE AUDIO GENERATION

RELATED APPLICATION

This application claims the benefit of U.S. Provisional Application No. 60/273,589, filed Mar. 5, 2001, entitled "Scripting Solution for Interactive Audio Environments", to Todor Fay et al., which is incorporated by reference herein.

TECHNICAL FIELD

This invention relates to audio processing with an audio generation system and, in particular, to a scripting solution to manage interactive audio generation.

BACKGROUND

Multimedia programs present content to a user through both audio and video events while a user interacts with a program via a keyboard, joystick, or other interactive input device. A user associates elements and occurrences of a video presentation with the associated audio representation. A common implementation is to associate audio with movement of characters or objects in a video game. When a new character or object appears, the audio associated with that entity is incorporated into the overall presentation for a more dynamic representation of the video presentation.

Audio representation is an essential component of electronic and multimedia products such as computer based and stand-alone video games, computer-based slide show presentations, computer animation, and other similar products and applications. As a result, audio generating devices and components are integrated into electronic and multimedia products for composing and providing graphically associated audio representations. These audio representations can be dynamically generated and varied in response to various input parameters, real-time events, and conditions. Thus, a user can experience the sensation of live audio or musical accompaniment with a multimedia experience.

Conventionally, computer audio is produced in one of two fundamentally different ways. One way is to reproduce an audio waveform from a digital sample of an audio source which is typically stored in a wave file (i.e., a .wav file). A digital sample can reproduce any sound, and the output is very similar on all sound cards, or similar computer audio rendering devices. However, a file of digital samples consumes a substantial amount of memory and resources when streaming the audio content. As a result, the variety of audio samples that can be provided using this approach is limited. Another disadvantage of this approach is that the stored digital samples cannot be easily varied.

Another way to produce computer audio is to synthesize musical instrument sounds, typically in response to instructions in a Musical Instrument Digital Interface (MIDI) file, to generate audio sound waves. MIDI is a protocol for recording and playing back music and audio on digital synthesizers incorporated with computer sound cards. Rather than representing musical sound directly, MIDI transmits information and instructions about how music is produced. The MIDI command set includes note-on, note-off, key velocity, pitch bend, and other commands to control a synthesizer.

The audio sound waves produced with a synthesizer are those already stored in a wavetable in the receiving instrument or sound card. A wavetable is a table of stored sound waves that are digitized samples of actual recorded sound. A wavetable can be stored in read-only memory (ROM) on a sound card chip, or provided with software. Prestoring sound waveforms in a lookup table improves rendered audio quality and throughput. An advantage of MIDI files is that they are compact and require few audio streaming resources, but the output is limited to the number of instruments available in the designated General MIDI set and in the synthesizer, and may sound very different on different computer systems.

MIDI instructions sent from one device to another indicate actions to be taken by the controlled device, such as identifying a musical instrument (e.g., piano, flute, drums, etc.) for music generation, turning on a note, and/or altering a parameter in order to generate or control a sound. In this way, MIDI instructions control the generation of sound by remote instruments without the MIDI control instructions themselves carrying sound or digitized information. A MIDI sequencer stores, edits, and coordinates the MIDI information and instructions. A synthesizer connected to a sequencer generates audio based on the MIDI information and instructions received from the sequencer. Many sounds and sound effects are a combination of multiple simple sounds generated in response to the MIDI instructions.

A MIDI system allows audio and music to be represented with only a few digital samples rather than converting an analog signal to many digital samples. The MIDI standard supports different channels that can each simultaneously provide an output of audio sound wave data. There are sixteen defined MIDI channels, meaning that no more than sixteen instruments can be playing at one time. Typically, the command input for each MIDI channel represents the notes corresponding to an instrument. However, MIDI instructions can program a channel to be a particular instrument. Once programmed, the note instructions for a channel will be played or recorded as the instrument for which the channel has been programmed. During a particular piece of music, a channel can be dynamically reprogrammed to be a different instrument.

A Downloadable Sounds (DLS) standard published by the MIDI Manufacturers Association allows wavetable synthesis to be based on digital samples of audio content provided at run-time rather than stored in memory. The data describing an instrument can be downloaded to a synthesizer and then played like any other MIDI instrument. Because DLS data can be distributed as part of an application, developers can be assured that the audio content will be delivered uniformly on all computer systems. Moreover, developers are not limited in their choice of instruments.

A DLS instrument is created from one or more digital samples, typically representing single pitches, which are then modified by a synthesizer to create other pitches. Multiple samples are used to make an instrument sound realistic over a wide range of pitches. DLS instruments respond to MIDI instructions and commands just like other MIDI instruments. However, a DLS instrument does not have to belong to the General MIDI set or represent a musical instrument at all. Any sound, such as a fragment of speech or a fully composed measure of music, can be associated with a DLS instrument.

Conventional Audio and Music System

FIG. 1 illustrates a conventional audio and music generation system 100 that includes a synthesizer 102, a sound effects input source 104, and a buffers component 106. Typically, a synthesizer is implemented in computer software, in hardware as part of a computer's internal sound card, or as an external device such as a MIDI keyboard or module. Synthesizer 102 receives MIDI inputs on sixteen channels 108 that conform to the MIDI standard. Synthesizer 102 includes a mixing component 110 that mixes the audio sound wave data output from synthesizer channels 108. An output 112 of mixing component 110 is input to an audio buffer in the buffers component 106.

MIDI inputs to synthesizer 102 are in the form of individual instructions, each of which designates the MIDI channel to which it applies. Within synthesizer 102, instructions associated with different channels 108 are processed in different ways, depending on the programming for the various channels. A MIDI input is typically a serial data stream that is parsed in synthesizer 102 into MIDI instructions and synthesizer control information. A MIDI command or instruction is represented as a data structure containing information about the sound effect or music piece such as the pitch, relative volume, duration, and the like.

A MIDI instruction, such as a "note-on", directs synthesizer 102 to play a particular note, or notes, on a synthesizer channel 108 having a designated instrument. The General MIDI standard defines standard sounds that can be combined and mapped into the sixteen separate instrument and sound channels. A MIDI event on a synthesizer channel 108 corresponds to a particular sound and can represent a keyboard key stroke, for example. The "note-on" MIDI instruction can be generated with a keyboard when a key is pressed and the "note-on" instruction is sent to synthesizer 102. When the key on the keyboard is released, a corresponding "note-off" instruction is sent to stop the generation of the sound corresponding to the keyboard key.

The audio representation for a video game involving a car, from the perspective of a person in the car, can be presented for an interactive video and audio presentation. The sound effects input source 104 has audio data that represents various sounds that a driver in a car might hear. A MIDI formatted music piece 114 represents the audio of the car's stereo. Input source 104 also has digital audio sample inputs that are sound effects representing the car's horn 116, the car's tires 118, and the car's engine 120.

The MIDI formatted input 114 has sound effect instructions 122(1–3) to generate musical instrument sounds. Instruction 122(1) designates that a guitar sound be generated on MIDI channel one (1) in synthesizer 102, instruction 120(2) designates that a bass sound be generated on MIDI channel two (2), and instruction 120(3) designates that drums be generated on MIDI channel ten (10). The MIDI channel assignments are designated when MIDI input 114 is authored, or created.

A conventional software synthesizer that translates MIDI instructions into audio signals does not support distinctly separate sets of MIDI channels. The number of sounds that can be played simultaneously is limited by the number of channels and resources available in the synthesizer. In the event that there are more MIDI inputs than there are available channels and resources, one or more inputs are suppressed by the synthesizer.

The buffers component 106 of audio system 100 includes multiple buffers 124(1–4). Typically, a buffer is an allocated area of memory that temporarily holds sequential samples of audio sound wave data that will be subsequently communicated to a sound card or similar audio rendering device to produce audible sound. The output 112 of synthesizer mixing component 110 is input to buffer 124(1) in buffers component 106. Similarly, each of the other digital sample sources are input to a buffer 124 in buffers component 106. The car horn sound effect 116 is input to buffer 124(2), the tires sound effect 118 is input to buffer 124(3), and the engine sound effect 120 is input to buffer 124(4).

Another problem with conventional audio generation systems is the extent to which system resources have to be allocated to support an audio representation for a video presentation. In the above example, each buffer 124 requires separate hardware channels, such as in a soundcard, to render the audio sound effects from input source 104.

Similarly, other three-dimensional (3-D) audio spatialization effects are difficult to create and require an allocation of system resources that may not be available when processing a video game that requires an extensive audio presentation. For example, to represent more than one car from a perspective of standing near a road in a video game, a pre-authored car engine sound effect 120 has to be stored in memory once for each car that will be represented. Additionally, a separate buffer 124 and separate hardware channels will need to be allocated for each representation of a car. If a computer that is processing the video game does not have the resources available to generate the audio representation that accompanies the video presentation, the quality of the presentation will be deficient.

Developing Interactive Audio

When developing audio content for a multimedia application in a development environment, such as when developing a video game program, the audio content is typically created by a composer or sound designer, and most of the implementation and integration of the audio content into the multimedia application is performed by an application developer, or game programmer. The audio sounds and music that are associated with a video presentation of the application are created by the sound designer and then implemented and encoded into the application code by the programmer.

The iterative process between a sound designer and an application developer to generate, provide, and implement audio content for a video application can be a slow process. The sound designer has to adjust volume levels, modify sound effects, change the music for a particular variable level, etc. for each audio rendition of a video event. Subsequently, the application developer has to encode each audio rendition into the video application in the right sequence and at the right time, depending on video game variables. For example, the music associated with a particular character in a video game might change when variables such as the character's health level, status, situation, environment, and the like changes. Further, a scene change may necessitate a transition to new music, or the intensity of the music can be increased or decreased based on the activity or excitement level in the game.

Accordingly, there is a need for techniques to abstract the development of an audio rendition corresponding to a video event in an encoded video application so that a sound designer and an application developer are not restricted to the conventional iterative application audio design process.

SUMMARY

A script file includes a text section that has text labels to designate a point during execution of a script sequence when audio renditions of one or more video events are to be initiated. The script file also includes a container that maintains audio content within the script file. The audio content is identified in the container with a content label that corresponds to a text label in the text section. The audio content is initiated to be generated as an audio rendition at a designated point during execution of the script sequence when the script file is executed and when a script processor determines that the content label corresponds to the text label.

Additionally, the container of the script file can also maintain a reference to additional audio content that is not maintained as part of the script file. The reference to the additional audio content is identified in the container with a reference label that corresponds to a second text label in the text section of the script file. The additional audio content is initiated to be generated as a second audio rendition at another designated point during execution of the script sequence when the script file is executed and when the script processor determines that the reference label corresponds to the second text label.

In an embodiment to manage audio generation, the text section of the script file includes an instruction set to instantiate a performance manager that includes at least one audio segment which has audio content components that generate audio instructions from the audio content. The text section of the script file also includes an instruction set to instantiate an audio rendition manager that includes one or more audio rendering components to process the audio instructions to generate an audio rendition corresponding to the audio content.

Additionally, the text section of the script file can include an instruction set to instantiate a script track as a component of the audio segment in the performance manager. The script track monitors one or more parameters of the audio segment and/or parameters of an application program that initiates execution of the script file to determine when to input the audio content to the audio segment to generate the audio content.

BRIEF DESCRIPTION OF THE DRAWINGS

The same numbers are used throughout the drawings to reference like features and components.

DETAILED DESCRIPTION

Figure 1:
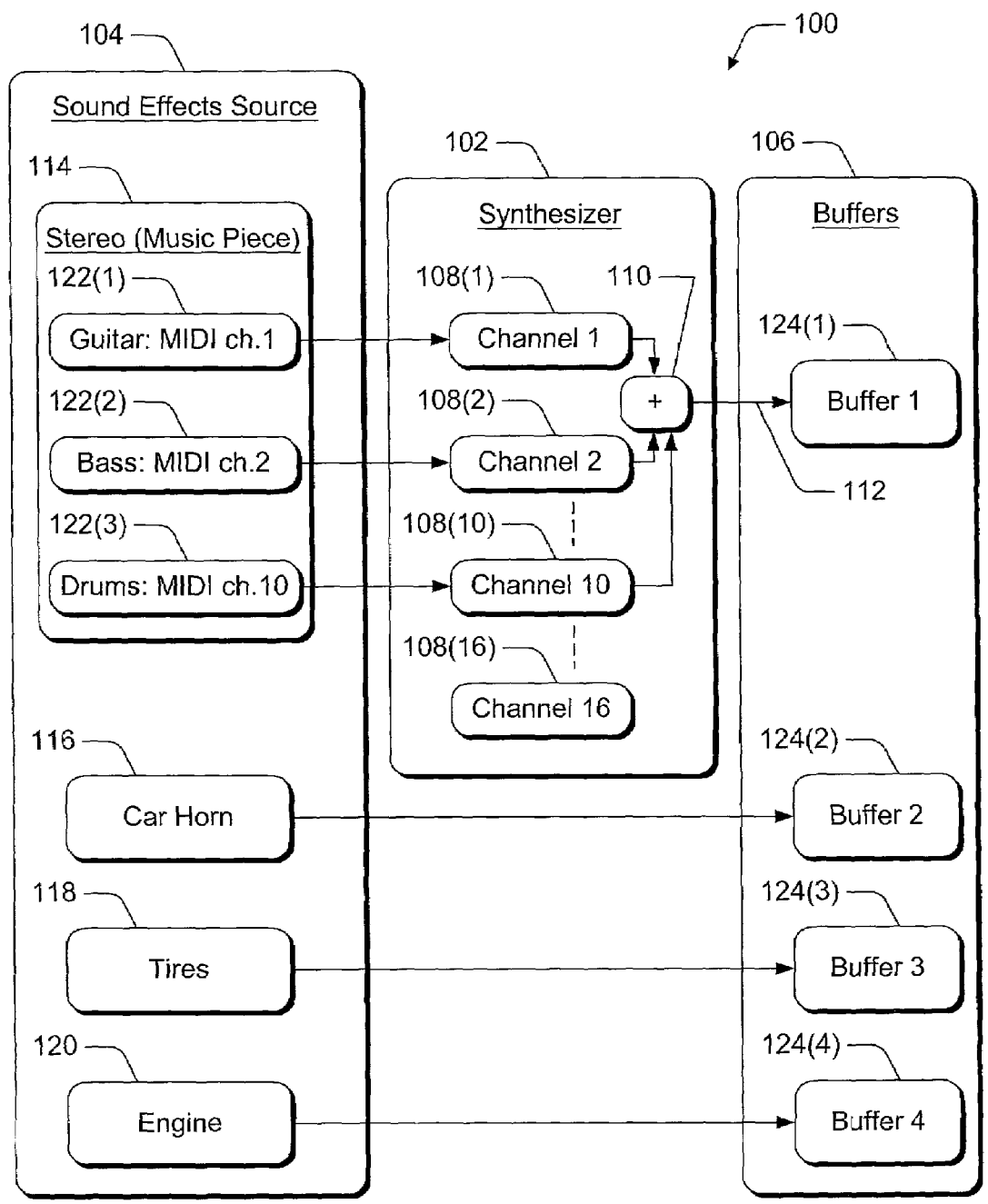
FIG. 1 illustrates a conventional audio generation system.

The following describes systems and methods for a scripting solution to manage interactive audio generation with an audio generation system that supports numerous computing systems' audio technologies, including technologies that are designed and implemented after a multimedia application program has been authored. An application program and/or script object instantiates the components of an audio generation system to produce, or otherwise generate, audio data that can be rendered with an audio rendering device to produce audible sound.

A scripting solution for managing the audio generation system is implemented to abstract the development of audio renditions corresponding to video events in an encoded video application. Audio content resources that are processed to generate the audio renditions are integrated with script files in an audio generation environment. A script file is a list of audio events or commands that are executed in sequence at a particular time in a multimedia application, such as a video game program.

A sound designer and/or application programmer can each control the details of audio implementation for a video game application. A script can be written that calls components of an audio generation system to alter music, for example, based on events and parameters programmed into the video game application. The scripting solution separates events that occur within the video game application, such as scene changes, excitement levels, etc., from the audio implementation and representation of those events. A sound designer can create and maintain audio content with the scripting solution without having the application programmer compile the audio content into the application code.

For example, a typical development example follows (in pseudo code):

```
Game Program Code:

Buffer = Gun.Load
...
When (gun weapon is fired)
{
SetVolume (Buffer, 200);
Play (Buffer);
}
```

For the game program code example, volume, pitch, and the media itself are hard-coded into the game application engine. If the sound designer chooses to change the current audio content of the "gun.wav" file, a new sound is created for the file and provided to the application programmer. Simply replacing the "gun.wav" file with another "gun.wav" file having a different sound is problematic in that other video events, or scenes, may be using the existing file. Replacing the file is further limiting if the sound designer creates a new sound that is a composite of two or more sounds requiring volume and pitch changes. If the sound designer decides that the sound is too loud for a corresponding video event, the application programmer is still needed to encode the application program with this trivial change.

With the scripting solution, the sound designer can change the audio content for a file and implement the new sound without having to recompile the application program code. The scripting solution provides an efficient audio development technique for multimedia applications, as well as an audio content management tool. When a script file is executed, it manages all of the audio content, embedded or referenced, that it uses or calls upon. When the script is released, the audio content files are also released without the application program having to manage the audio content.

An audio generation system includes an audio rendition manager (also referred to herein as an "AudioPath") that is implemented to provide various audio data processing components that process audio data into audible sound. The audio generation system described herein simplifies the process of creating audio representations for interactive applications such as video games and Web sites. The audio rendition manager manages the audio creation process and integrates both digital audio samples and streaming audio.

Additionally, an audio rendition manager provides real-time, interactive control over the audio data processing for audio representations of video presentations. An audio rendition manager also enables 3-D audio spatialization processing for an individual audio representation of an entity's video presentation. Multiple audio renditions representing multiple video entities can be accomplished with multiple audio rendition managers, each representing a video entity, or audio renditions for multiple entities can be combined in a single audio rendition manager.

Real-time control of audio data processing components in an audio generation system is useful, for example, to control an audio representation of a video game presentation when parameters that are influenced by interactivity with the video game change, such as a video entity's 3-D positioning in response to a change in a video game scene. Other examples include adjusting audio environment reverb in response to a change in a video game scene, or adjusting music transpose in response to a change in the emotional intensity of a video game scene.

Exemplary Audio Generation System

Figure 2:
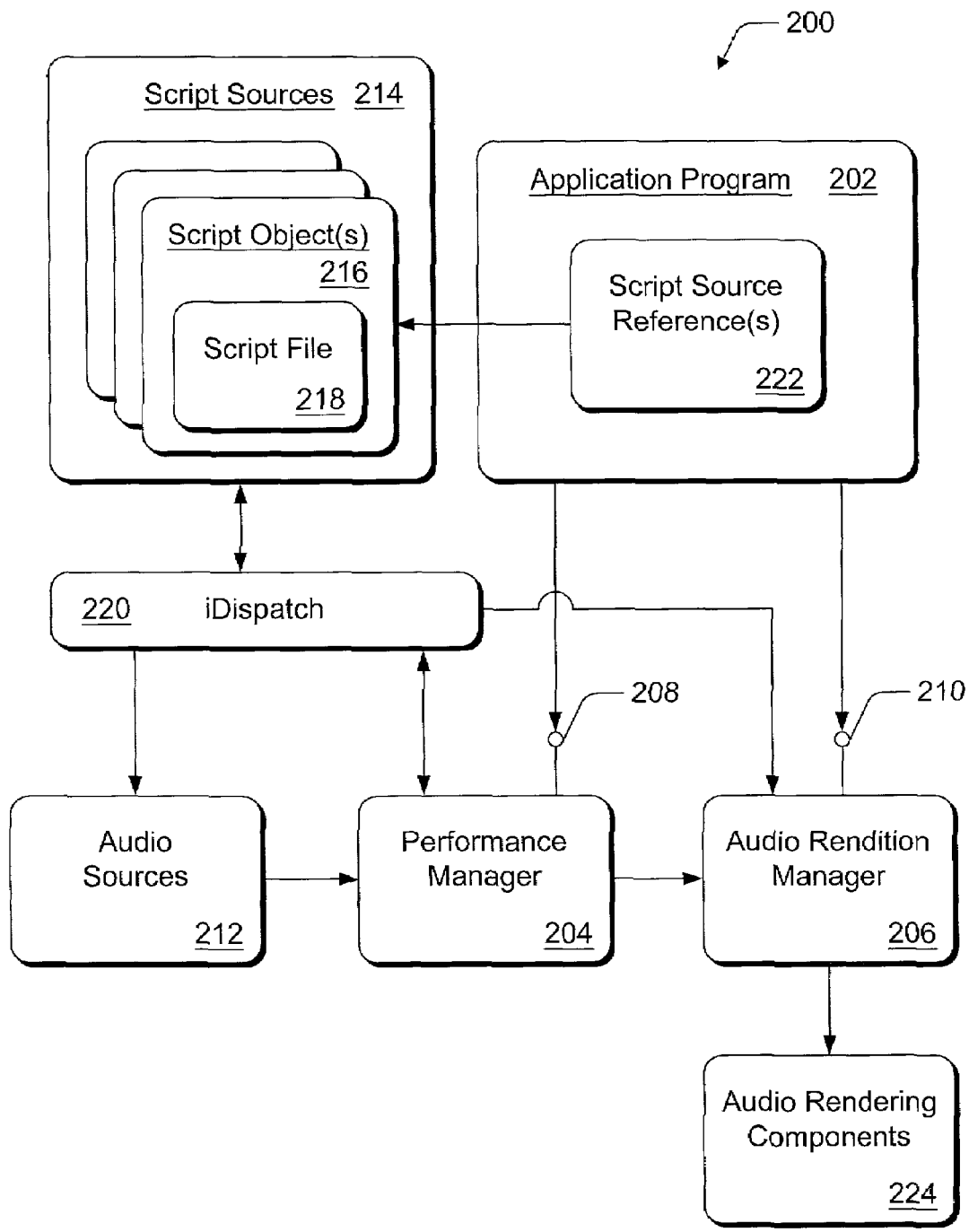
FIG. 2 illustrates various components of an exemplary audio generation system.

FIG. 2 illustrates an audio generation system 200 having components that can be implemented within a computing device, or the components can be distributed within a computing system having more than one computing device. The audio generation system 200 generates audio events that are processed and rendered by separate audio processing components of a computing device or system. See the description of "Exemplary Computing System and Environment" below for specific examples and implementations of network and computing systems, computing devices, and components that can be used to implement the technology described herein.

Audio generation system 200 includes an application program 202, a performance manager component 204, and an audio rendition manager 206 (also referred to herein as an "AudioPath"). Application program 202 is one of a variety of different types of applications, such as a video game program, some other type of entertainment program, or any other application that incorporates an audio representation with a video presentation.

The performance manager 204 and the audio rendition manager 206 can be instantiated as programming objects. The application program 202 interfaces with the performance manager 204, the audio rendition manager 206, and the other components of the audio generation system 200 via application programming interfaces (APIs). For example, application program 202 can interface with the performance manager 204 via API 208 and with the audio rendition manager 206 via API 210.

The various components described herein, such as the performance manager 204 and the audio rendition manager 206, can be implemented using standard programming techniques, including the use of OLE (object linking and embedding) and COM (component object model) interfaces. COM objects are implemented in a system memory of a computing device, each object having one or more interfaces, and each interface having one or more methods. The interfaces and interface methods can be called by application programs and by other objects. The interface methods of the objects are executed by a processing unit of the computing device. Familiarity with object-based programming, and with COM objects in particular, is assumed throughout this disclosure. However, those skilled in the art will recognize that audio generation systems and the various components described herein are not limited to a COM and/or OLE implementation, or to any other specific programming technique.

The audio generation system 200 includes audio sources 212 that provide digital samples of audio data such as from a wave file (i.e., a .wav file), message-based data such as from a MIDI file or a pre-authored segment file, or an audio sample such as a Downloadable Sound (DLS). Audio sources can be also be stored as a resource component file of an application rather than in a separate file.

Audio generation system 200 also includes script sources 214, such as one or more script object(s) 216. A script object 216 maintains an associated script file 218 which can be executed to reference and instantiate performance manager 204, audio rendition manager 206, and other components of audio generation system 200, as well as manage audio sources 212 and the rendering of audio content.

The script sources 214, such as script object 216, interfaces with performance manager 204, audio rendition manager 206, and the other components of the audio generation system 200 via an iDispatch application layer 220. The iDispatch application 220 is a translation interface between a script object and components of the audio generation system 200 which provides a mechanism to access and retrieve information about an object component's methods and properties. Those skilled in the art will recognize that other interface applications can be implemented to interface the script objects with components of the audio generation system 200.

Application program 202 can initiate that an audio source 212 provide audio content input to performance manager 204. Alternatively, or in addition, application program 202 includes one or more script source reference(s) 222 to reference a script source, such as script object 216, and initiate execution of script file 218. Script file 218 can also initiate that an audio source 212 provide audio content input to performance manager 204. Script file 218 can also include embedded audio sources, or audio content, that can be input to performance manager 204.

Multiple scripts can be loaded and executed at the same time. Two different scripts contain separate variables, yet may have script routines identified with the same name, or identifier. Multiple scripts interact with each other as objects and one script can load another script and call methods, set data, set variables, etc. of the other script. The script routines in a script become its methods when it is referenced by another script and the variables become its properties.

The performance manager 204 receives the audio content from audio sources 212 and produces audio instructions for input to the audio rendition manager 206. The audio rendition manager 206 receives the audio instructions and generates audio sound wave data. The audio generation system 200 includes audio rendering components 224 which are hardware and/or software components, such as a speaker or soundcard, that renders audio from the audio sound wave data received from the audio rendition manager 206.

Figure 3:
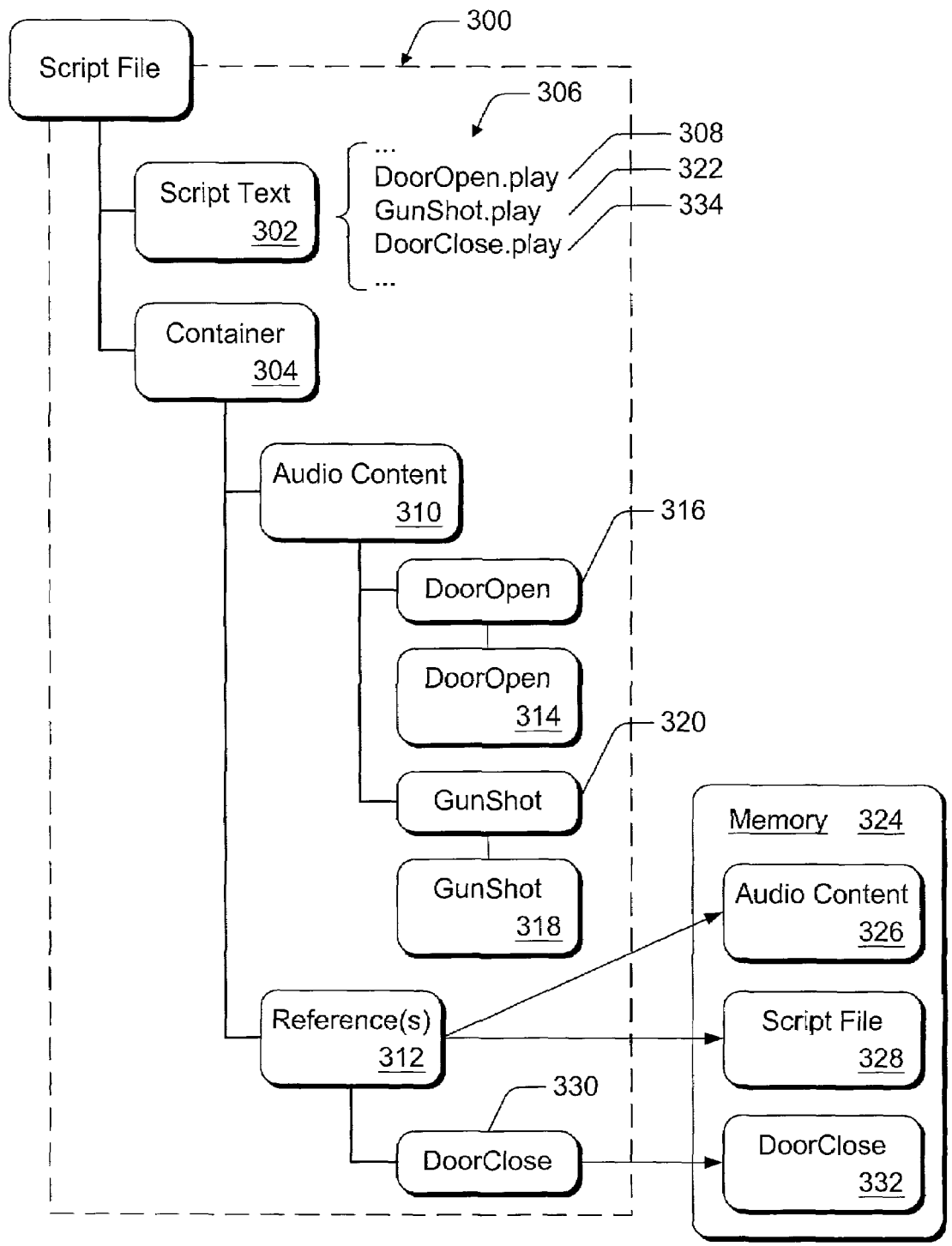
FIG. 3 illustrates an exemplary script object file.

FIG. 3 illustrates an exemplary script file 300 which can be implemented as a data component of a COM object, such as script file 218 which is maintained as script object 216. Script file 300 is a nested structure that includes a script text section 302 and a container 304. Script text 302 is the text of the script file that is executed by a script processor (not shown) of an audio generation system. Scripts can be written in any ActiveX® scripting language, such as VBScript (Visual Basic® Script), Jscript®, or AudioVBScript®. These scripting languages are scripting development tools available from Microsoft Corporation of Redmond, Wash.

Those skilled in the art will recognize that any number of other scripting languages can be implemented as alternatives to ActiveX® scripting.

Script text 302 includes an example of part of a script sequence 306 in which a text label 308, identified as "DoorOpen", designates a point during execution of the script sequence when an audio rendition of a video event is to be generated. Container 304 maintains various audio content 310 within script file 300 and one or more audio content references 312. When a script file that contains and/or references audio content is created, the included and/or referenced audio content can be loaded when the script file is loaded, or the script can designate which content to load as needed.

Audio content 310 includes managed content, such as "DoorOpen" audio content 314 that is identified in container 304 with a content label 316 that corresponds to the "DoorOpen" text label 308 in script sequence 306. In this example, "DoorOpen" audio content 314 is a .wav file that plays the sound, or an audio rendition, of a door opening at the designated point during execution of the script sequence 306. The audio content .wav file 314 is auto-referable within script file 300 such that it is "visible" for use without a reference in text section 302 to identify a location of the audio content, and/or without an instruction in text section 302 to render the audio content.

Typically, audio content is referenced with a load instruction that also includes a file path, a memory location, or resource ID of where to find the audio content, such as: dooropen=load c:/dooropen.wav. Such an instruction is not needed for script file 300, or the scripting solution described herein. A script processor of the audio generation system initiates the audio rendition of a video event when determining that content label 316 for audio content 314 corresponds to text label 308. Audio content 310 also includes "GunShot" audio content 318 that is identified in container 304 with a content label 320 that corresponds to the "GunShot" text label 322 in script sequence 306. In this example, "GunShot" audio content 318 is a .wav file that plays the sound, or an audio rendition, of a gun shot at the designated point during execution of script sequence 306.

Audio content reference(s) 312 can be implemented as programming references to content maintained in a memory component 324. Content references 312 can designate any format of audio content 326, or another script file 328. Reference(s) 312 includes a reference label 330 that identifies a reference to "DoorClose" audio content 332 that is maintained in memory component 324. Reference label 330 corresponds to the "DoorClose" text label 334 in script sequence 306. In this example, "DoorClose" audio content 332 is a .wav file that plays the sound, or an audio rendition, of a door closing at the designated point during execution of script sequence 306.

Figure 4:
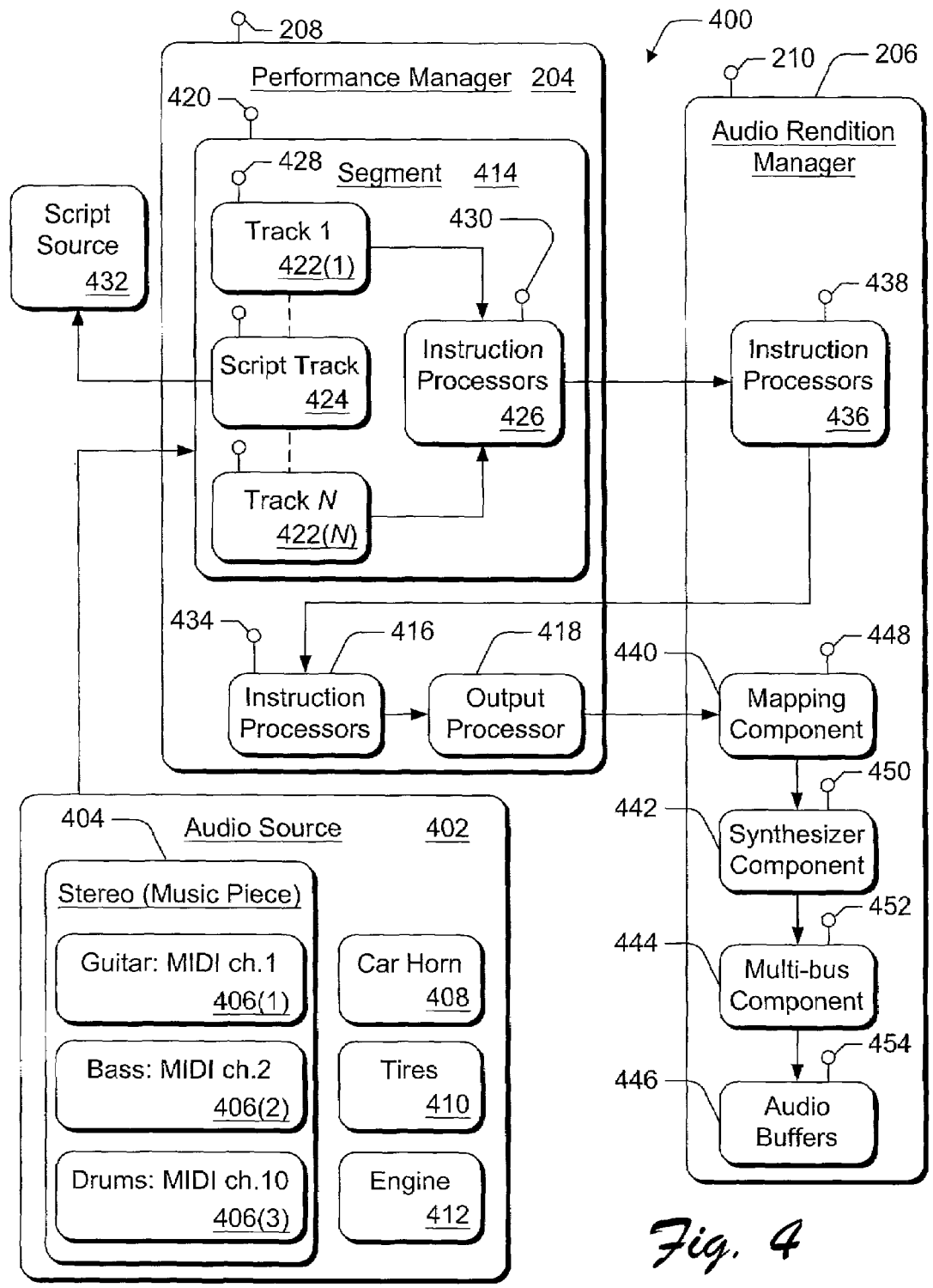
FIG. 4 illustrates various components of the audio generation system shown in FIG. 2.

FIG. 4 illustrates a performance manager 204 and an audio rendition manager 206 as part of an audio generation system 400. An audio source 402 provides sound effects for an audio representation of various sounds that a driver of a car might hear in a video game, for example. The various sound effects can be presented to enhance the perspective of a person sitting in the car for an interactive video and audio presentation.

The audio source 402 has a MIDI formatted music piece 404 that represents the audio of a car stereo. The MIDI input 404 has sound effect instructions 406(1–3) to generate musical instrument sounds. Instruction 406(1) designates that a guitar sound be generated on MIDI channel one (1) in a synthesizer component, instruction 406(2) designates that a bass sound be generated on MIDI channel two (2), and instruction 406(3) designates that drums be generated on MIDI channel ten (10). Input source 402 also has digital audio sample inputs that represent a car horn sound effect 408, a tires sound effect 410, and an engine sound effect 412.

The performance manager 204 can receive audio content from a wave file (i.e., .wav file), a MIDI file, or a segment file authored with an audio production application, such as DirectMusic® Producer, for example. DirectMusic® Producer is an authoring tool for creating interactive audio content and is available from Microsoft Corporation of Redmond, Wash. Additionally, performance manager 204 can receive audio content that is composed at run-time from different audio content components.

Performance manager 204 receives audio content input from audio source 402 and produces audio instructions for input to the audio rendition manager 206. Performance manager 204 includes a segment component 414, an instruction processors component 416, and an output processor 418. The segment component 414 represents the audio content input from audio source 402. Although performance manager 204 is shown having only one segment 414, the performance manager can have a primary segment and any number of secondary segments. Multiple segments can be arranged concurrently and/or sequentially with performance manager 204.

Segment component 414 can be instantiated as a programming object having one or more interfaces 420 and associated interface methods. In the described embodiment, segment object 414 is an instantiation of a COM object class and represents an audio or musical piece. An audio segment represents a linear interval of audio data or a music piece and is derived from the inputs of an audio source which can be digital audio data, such as the engine sound effect 412 in audio source 402, or event-based data, such as the MIDI formatted input 404.

Segment component 414 has track components 422(1) through 422(N), a script track 424, and an instruction processors component 426. Segment 414 can have any number of track components 422 and can combine different types of audio data in the segment with different track components. Each type of audio data corresponding to a particular segment is contained in a track component 422 in the segment. An audio segment is generated from a combination of the tracks in the segment. Thus, segment 414 has a track 422 for each of the audio inputs from audio source 402.

Each segment object contains references to one or a plurality of track objects. Track components 422(1) through 422(N), and script track 424, can be instantiated as programming objects having one or more interfaces 428 and associated interface methods. The track objects 422 are played together to render the audio and/or musical piece represented by segment object 414 which is part of a larger overall performance. When first instantiated, a track object does not contain actual music or audio performance data, such as a MIDI instruction sequence. However, each track object has a stream input/output (I/O) interface method through which audio data is specified.

The track objects 422(1) through 422(N) generate event instructions for audio and music generation components when performance manager 204 plays the segment 414. Audio data is routed through the components in the performance manager 204 in the form of event instructions which contain information about the timing and routing of the audio data. The event instructions are routed between and through the components in performance manager 204 on designated performance channels. The performance channels are allocated as needed to accommodate any number of audio input sources and routing event instructions.

To play a particular audio or musical piece, performance manager 204 calls segment object 414 and specifies a time interval or duration within the musical segment. The segment object in turn calls the track play methods of each of its track objects 422, specifying the same time interval. The track objects 422 respond by independently rendering event instructions at the specified interval. This is repeated, designating subsequent intervals, until the segment has finished its playback over the specified duration.

The event instructions generated by a track 422 in segment 414 are input to the instruction processors component 426 in the segment. The instruction processors component 426 can be instantiated as a programming object having one or more interfaces 430 and associated interface methods. The instruction processors component 426 has any number of individual event instruction processors (not shown) and represents the concept of a "graph" that specifies the logical relationship of an individual event instruction processor to another in the instruction processors component. An instruction processor can modify an event instruction and pass it on, delete it, or send a new instruction.

Segment 414 can include one, or any number of script tracks, such as script track 424. Script tracks can also be instantiated as programming objects having one or more interfaces and associated interface methods to reference scripts and sequence calls to their routines at specified points in time. A script track object 424 can monitor the audio rendition and/or musical piece represented by segment object 414, one or more parameters of audio segment 414, a portion of the overall performance which includes segment object 414, and/or parameters and aspects of a video event in a multimedia application to determine when to initiate execution of a script file, or any number of other event modifying actions. For example, script track 424 communicates with script source 432 to initiate execution of an associated script file based on events and/or parameters of a video game application, such as scene changes, excitement levels, action intensity, etc. Further, audio content can be self-monitoring and self-modifying with an embedded script track file that instantiates as a script track to monitor the audio segment that loads the audio content.

A script track can be implemented as a sequence of events, where each event is assigned a specific time in the music or audio rendition, a script reference, and a routine to call in that script. Time can be specified in terms of measure, beat, grid and tick count, or in milliseconds. A script event can also be set to a negative time to ensure proper ordering of events. When playback of an audio segment reaches the time of an event, the specified script routine is called.

The instruction processors component 416 in performance manager 204 also processes, or modifies, the event instructions. The instruction processors component 416 can be instantiated as a programming object having one or more interfaces 434 and associated interface methods. The event instructions are routed from the performance manager instruction processors component 416 to the output processor 418 which converts the event instructions to MIDI formatted audio instructions. The audio instructions are then routed to audio rendition manager 206.

The audio rendition manager 206 processes audio data to produce one or more instances of a rendition corresponding to an audio source, or audio sources. That is, audio content from multiple sources can be processed and played on a single audio rendition manager 206 simultaneously. Rather than allocating buffer and hardware audio channels for each sound, an audio rendition manager 206 can be instantiated, or otherwise created, to process multiple sounds from multiple sources.

For example, a rendition of the sound effects in audio source 402 can be processed with a single audio rendition manager 206 to produce an audio representation from a spatialization perspective of inside a car. Additionally, the audio rendition manager 206 dynamically allocates hardware channels (e.g., audio buffers to stream the audio wave data) as needed and can render more than one sound through a single hardware channel because multiple audio events are pre-mixed before being rendered via a hardware channel.

The audio rendition manager 206 has an instruction processors component 332 that receives event instructions from the output of the instruction processors component 436 in segment 414 in the performance manager 204. The instruction processors component 436 in the audio rendition manager 206 is also a graph of individual event instruction modifiers that process event instructions. Although not shown, the instruction processors component 436 can receive event instructions from any number of segment outputs. Additionally, the instruction processors component 436 can be instantiated as a programming object having one or more interfaces 438 and associated interface methods.

The audio rendition manager 206 also includes several component objects that are logically related to process the audio instructions received from output processor 418 of performance manager 204. The audio rendition manager 206 has a mapping component 440, a synthesizer component 442, a multi-bus component 444, and an audio buffers component 446.

Mapping component 440 can be instantiated as a programming object having one or more interfaces 448 and associated interface methods. The mapping component 440 maps the audio instructions received from output processor 418 in the performance manager 204 to the synthesizer component 442. Although not shown, an audio rendition manager can have more than one synthesizer component. The mapping component 440 communicates audio instructions from multiple sources (e.g., multiple performance channel outputs from output processor 418) for input to one or more synthesizer components 442 in the audio rendition manager 206.

The synthesizer component 442 can be instantiated as a programming object having one or more interfaces 450 and associated interface methods. Synthesizer component 442 receives the audio instructions from output processor 418 via the mapping component 440. Synthesizer component 442 generates audio sound wave data from stored wavetable data in accordance with the received MIDI formatted audio instructions. Audio instructions received by the audio rendition manager 206 that are already in the form of audio wave data are mapped through to the synthesizer component 442, but are not synthesized.

A segment component that corresponds to audio content from a wave file is played by the performance manager 204 like any other segment. The audio data from a wave file is routed through the components of the performance manager 204 on designated performance channels and is routed to the audio rendition manager 206 along with the MIDI formatted audio instructions. Although the audio content from a wave file is not synthesized, it is routed through the synthesizer component 442 and can be processed by MIDI controllers in the synthesizer.

The multi-bus component 444 can be instantiated as a programming object having one or more interfaces 452 and associated interface methods. The multi-bus component 444 routes the audio wave data from the synthesizer component 442 to the audio buffers component 446. The multi-bus component 444 is implemented to represent actual studio audio mixing. In a studio, various audio sources such as instruments, vocals, and the like (which can also be outputs of a synthesizer) are input to a multi-channel mixing board that then routes the audio through various effects (e.g., audio processors), and then mixes the audio into the two channels that are a stereo signal.

The audio buffers component 446 can be instantiated as a programming object or objects having one or more interfaces 454 and associated interface methods. The audio buffers component 446 receives the audio wave data from synthesizer component 442 via the multi-bus component 444. Individual audio buffers, such as a hardware audio channel, in the audio buffers component 446 receive the audio wave data and stream the audio wave data in real-time to an audio rendering device, such as a sound card, that produces the rendition represented by the audio rendition manager 206 as audible sound.

The various component configurations described herein support COM interfaces for reading and loading the configuration data from a file. To instantiate the components, an application program or a script file instantiates a component using a COM function. The components of the audio generation systems described herein are implemented with COM technology and each component corresponds to an object class and has a corresponding object type identifier or CLSID (class identifier). A component object is an instance of a class and the instance is created from a CLSID using a COM function called CoCreateInstance. However, those skilled in the art will recognize that the audio generation systems and the various components described herein are not limited to a COM implementation, or to any other specific programming technique.

Exemplary Audio Rendition Components

Figure 5:
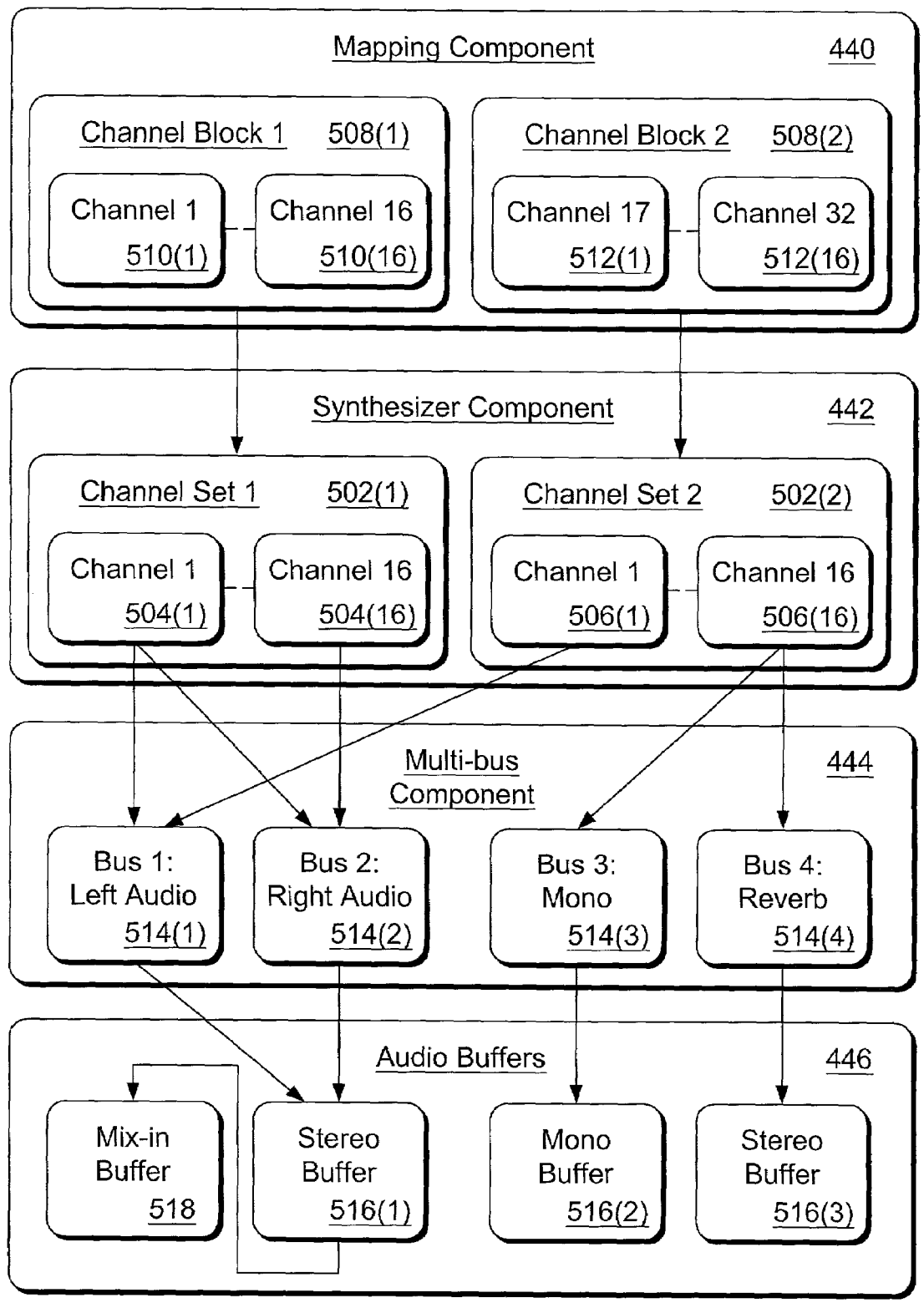
FIG. 5 illustrates various components of the audio generation system shown in FIG. 4.

FIG. 5 illustrates various audio data processing components of the audio rendition manager 206 in accordance with an implementation of the audio generation systems described herein. Details of the mapping component 440, synthesizer component 442, multi-bus component 444, and the audio buffers component 446 (FIG. 4) are illustrated, as well as a logical flow of audio data instructions through the components.

Synthesizer component 442 has two channel sets 502(1) and 502(2), each having sixteen MIDI channels 504(1–16) and 506(1–16), respectively. Those skilled in the art will recognize that a group of sixteen MIDI channels can be identified as channels zero through fifteen (0–15). For consistency and explanation clarity, groups of sixteen MIDI channels described herein are designated in logical groups of one through sixteen (1–16). A synthesizer channel is a communications path in synthesizer component 442 represented by a channel object. A channel object has APIs and associated interface methods to receive and process MIDI formatted audio instructions to generate audio wave data that is output by the synthesizer channels.

To support the MIDI standard, and at the same time make more MIDI channels available in a synthesizer to receive MIDI inputs, channel sets are dynamically created as needed. As many as 65,536 channel sets, each containing sixteen channels, can be created and can exist at any one time for a total of over one million available channels in a synthesizer component. The MIDI channels are also dynamically allocated in one or more synthesizers to receive multiple audio instruction inputs. The multiple inputs can then be processed at the same time without channel overlapping and without channel clashing. For example, two MIDI input sources can have MIDI channel designations that designate the same MIDI channel, or channels. When audio instructions from one or more sources designate the same MIDI channel, or channels, the audio instructions are routed to a synthesizer channel 504 or 506 in different channel sets 502(1) or 502(2), respectively.

Mapping component 440 has two channel blocks 508(1) and 508(2), each having sixteen mapping channels to receive audio instructions from output processor 418 in the performance manager 204. The first channel block 508(1) has sixteen mapping channels 510(1–16) and the second channel block 508(2) has sixteen mapping channels 512 (1–16). The channel blocks 508 are dynamically created as needed to receive the audio instructions. The channel blocks 508 each have sixteen channels to support the MIDI standard and the mapping channels are identified sequentially. For example, the first channel block 508(1) has mapping channels one through sixteen (1–16) and the second channel block 508(2) has mapping channels seventeen through thirty-two (17–32). A subsequent third channel block would have sixteen channels thirty-three through forty-eight (33–48).

Each channel block 508 corresponds to a synthesizer channel set 502, and each mapping channel in a channel block maps directly to a synthesizer channel in a synthesizer channel set. For example, the first channel block 508(1) corresponds to the first channel set 502(1) in synthesizer component 442. Each mapping channel 510(1–16) in the first channel block 508(1) corresponds to each of the sixteen synthesizer channels 504(1–16) in channel set 502(1). Additionally, channel block 508(2) corresponds to the second channel set 502(2) in synthesizer component 442. A third channel block can be created in mapping component 440 to correspond to a first channel set in a second synthesizer component (not shown).

Mapping component 440 allows multiple audio instruction sources to share available synthesizer channels, and dynamically allocating synthesizer channels allows multiple source inputs at any one time. Mapping component 440 receives the audio instructions from output processor 418 in the performance manager 204 so as to conserve system resources such that synthesizer channel sets are allocated only as needed. For example, mapping component 440 can receive a first set of audio instructions on mapping channels 510 in the first channel block 508 that designate MIDI channels one (1), two (2), and four (4) which are then routed to synthesizer channels 504(1), 504(2), and 504(4), respectively, in the first channel set 502(1).

When mapping component 440 receives a second set of audio instructions that designate MIDI channels one (1), two (2), three (3), and ten (10), the mapping component routes the audio instructions to synthesizer channels 504 in the first channel set 502(1) that are not currently in use, and then to synthesizer channels 506 in the second channel set 502(2). For example, the audio instruction that designates MIDI channel one (1) is routed to synthesizer channel 506(1) in the second channel set 502(2) because the first MIDI channel 504(1) in the first channel set 502(1) already has an input from the first set of audio instructions. Similarly, the audio instruction that designates MIDI channel two (2) is routed to synthesizer channel 506(2) in the second channel set 502(2) because the second MIDI channel 504(2) in the first channel set 502(1) already has an input. The mapping component 440 routes the audio instruction that designates MIDI channel three (3) to synthesizer channel 504(3) in the first channel set 502(1) because the channel is available and not currently in use. Similarly, the audio instruction that designates MIDI channel ten (10) is routed to synthesizer channel 504(10) in the first channel set 502(1).

When particular synthesizer channels are no longer needed to receive MIDI inputs, the resources allocated to create the synthesizer channels are released as well as the resources allocated to create the channel set containing the synthesizer channels. Similarly, when unused synthesizer channels are released, the resources allocated to create the channel block corresponding to the synthesizer channel set are released to conserve resources.

Multi-bus component 444 has multiple logical buses 514(1–4). A logical bus 514 is a logic connection or data communication path for audio wave data received from synthesizer component 442. The logical buses 514 receive audio wave data from the synthesizer channels 504 and 506 and route the audio wave data to the audio buffers component 446. Although the multi-bus component 444 is shown having only four logical buses 514(1–4), it is to be appreciated that the logical buses are dynamically allocated as needed, and released when no longer needed. Thus, the multi-bus component 444 can support any number of logical buses at any one time as needed to route audio wave data from synthesizer component 442 to the audio buffers component 446.

The audio buffers component 446 includes three buffers 516(1–3) that are consumers of the audio wave data output by synthesizer component 442. The buffers 516 receive the audio wave data via the logical buses 514 in the multi-bus component 444. An audio buffer 516 receives an input of audio wave data from one or more logical buses 514, and streams the audio wave data in real-time to a sound card or similar audio rendering device. An audio buffer 516 can also process the audio wave data input with various effects-processing (i.e., audio data processing) components before sending the data to be further processed and/or rendered as audible sound. Although not shown, the effects processing components are created as part of a buffer 516 and a buffer can have one or more effects processing components that perform functions such as control pan, volume, 3-D spatialization, reverberation, echo, and the like.

The audio buffers component 446 includes three types of buffers. The input buffers 516 receive the audio wave data output by the synthesizer component 442. A mix-in buffer 518 receives data from any of the other buffers, can apply effects processing, and mix the resulting wave forms. For example, mix-in buffer 518 receives an input from input buffer 516(1). Mix-in buffer 518, or mix-in buffers, can be used to apply global effects processing to one or more outputs from the input buffers 516. The outputs of the input buffers 516 and the output of the mix-in buffer 518 are input to a primary buffer (not shown) that performs a final mixing of all of the buffer outputs before sending the audio wave data to an audio rendering device.

The audio buffers component 446 includes a two channel stereo buffer 516(1) that receives audio wave data input from logic buses 514(1) and 514(2), a single channel mono buffer 516(2) that receives audio wave data input from logic bus 514(3), and a single channel reverb stereo buffer 516(3) that receives audio wave data input from logic bus 514(4). Each logical bus 514 has a corresponding bus function identifier that indicates the designated effects-processing function of the particular buffer 516 that receives the audio wave data output from the logical bus. For example, a bus function identifier can indicate that the audio wave data output of a corresponding logical bus will be to a buffer 516 that functions as a left audio channel such as from bus 514(1), a right audio channel such as from bus 514(2), a mono channel such as from bus 514(3), or a reverb channel such as from bus 514(4). Additionally, a logical bus can output audio wave data to a buffer that functions as a three-dimensional (3-D) audio channel, or output audio wave data to other types of effects-processing buffers.

A logical bus 514 can have more than one input, from more than one synthesizer, synthesizer channel, and/or audio source. Synthesizer component 442 can mix audio wave data by routing one output from a synthesizer channel 504 and 506 to any number of logical buses 514 in the multi-bus component 444. For example, bus 514(1) has multiple inputs from the first synthesizer channels 504(1) and 506(1) in each of the channel sets 502(1) and 502(2), respectively. Each logical bus 514 outputs audio wave data to one associated buffer 516, but a particular buffer can have more than one input from different logical buses. For example, buses 514(1) and 514(2) output audio wave data to one designated buffer 516(1). The designated buffer 516(1), however, receives the audio wave data output from both buses.

Although the audio buffers component 446 is shown having only three input buffers 516(1–3) and one mix-in buffer 518, it is to be appreciated that there can be any number of audio buffers dynamically allocated as needed to receive audio wave data at any one time. Furthermore, although the multi-bus component 444 is shown as an independent component, it can be integrated with the synthesizer component 442, or with the audio buffers component 446.

Exemplary Audio Generation System

Figure 6:
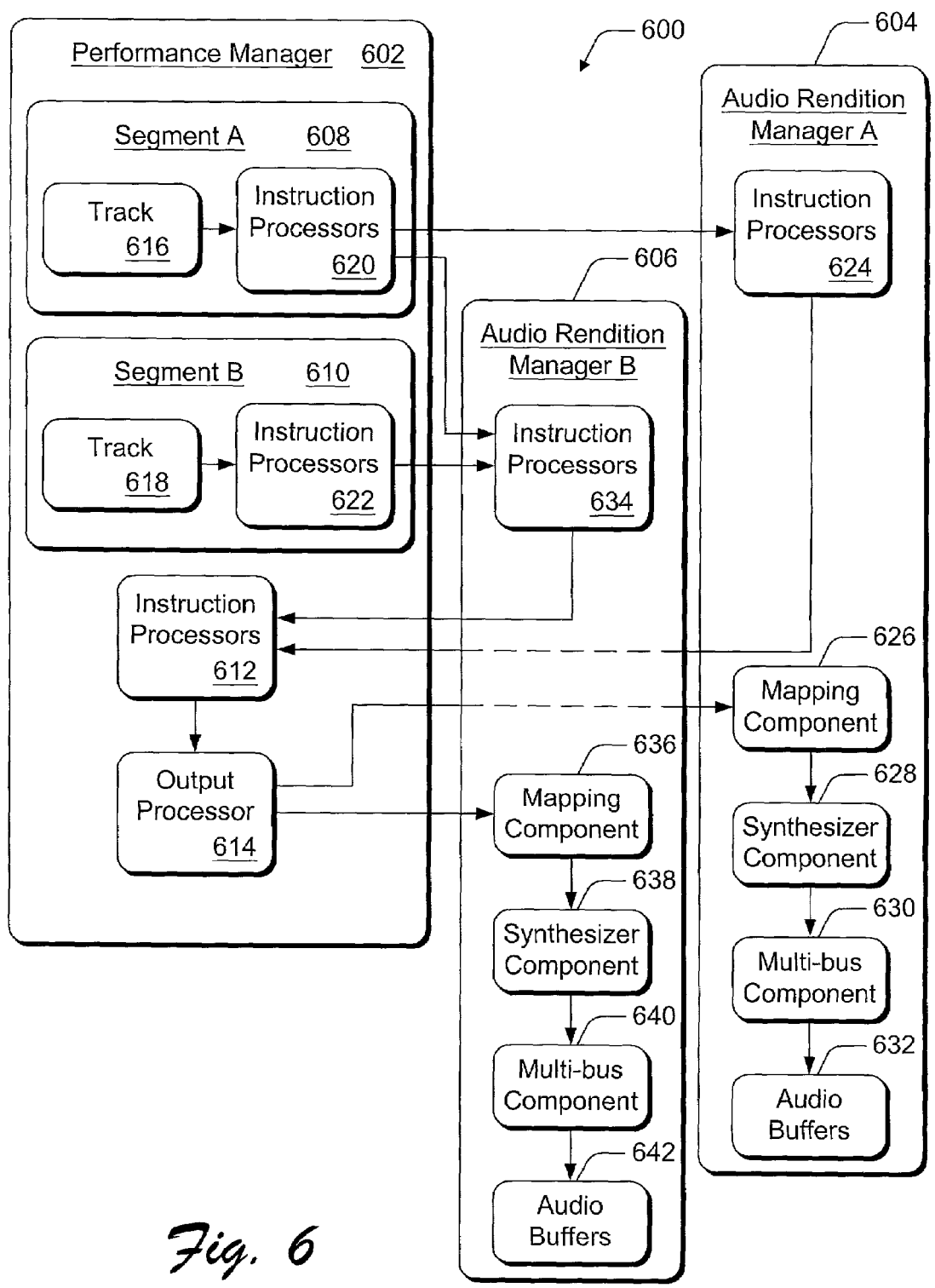
FIG. 6 illustrates various components of an exemplary audio generation system.

FIG. 6 illustrates an exemplary audio generation system 600 having a performance manager 602 and two audio rendition managers 604 and 606. The individual components illustrated in FIG. 6 are described above with reference to similar components shown in FIGS. 4 and 5. Performance manager 602 has a first segment component 608 and a second segment component 610, as well as an instruction processors component 612 and an output processor 614. Each of the segment components 608 and 610 represent audio content from an input source, such as audio source 402 (FIG. 4). Each segment component 608 and 610 has a track component 616 and 618, and an instruction processors component 620 and 622, respectively.

Multiple audio rendition managers can be instantiated, each corresponding to a segment in a performance manager. Additionally, multiple audio rendition managers can be instantiated corresponding to only one segment. That is, multiple instances of a rendition can be created from one segment (e.g., one audio source). In FIG. 6, audio rendition manager 604 corresponds to the first segment 608 and receives event instructions generated by track component 616. Audio rendition component 606 corresponds to both the first segment 608 and to the second segment 610 and receives event instructions generated by track components 616 and 618, respectively. Although not shown, audio rendition manager 604 can also receive event instructions generated by track component 618 in segment 610.

Audio rendition manager 604 has an instruction processors component 624, a mapping component 626, a synthesizer component 628, a multi-bus component 630, and an audio buffers component 632. Similarly, audio rendition manager 606 has an instruction processors component 634, a mapping component 636, a synthesizer component 638, a multi-bus component 640, and an audio buffers component 642. Although not shown, either audio rendition manager 604 and 606 can share audio rendering components with the other to conserve system resources. For example, audio buffers allocated in the audio buffers component of one audio rendition manager can be used to mix audio data from another audio rendition manager.

Track component 616 in the first segment 608 generates event instructions that are routed to the instruction processors component 624 in the first audio rendition manager 604. Track component 618 in the second segment 610 generates event instructions that are routed to the instruction processors component 634 in the second audio rendition manager 606. The event instruction outputs of both the instruction processors components 624 and 634 are routed to the instruction processors component 612 in the performance manager 602.

The event instructions from both audio rendition managers 604 and 606 are then routed from the instruction processors component 612 in performance manager 602 to the output processor 614 where the event instructions are converted to audio instructions for input to the respective audio rendition managers. As described above with respect to FIG. 4, event instructions are routed through and between the components in the performance manager 602 on designated performance channels which are allocated as needed to accommodate any number of event instructions.

In addition to providing an audio rendition manager to process multiple sounds as described above with reference to FIG. 4, an audio rendition manager can be provided for each instance of a rendition corresponding to an audio source. For example, to create audio representations for two people sitting in a car, both of the audio rendition managers 604 and 606 can be created to generate a rendition of the sound effects in audio source 402 (FIG. 4). Each audio rendition manager would then represent the perspective of one of the people sitting in the car. Those skilled in the art will recognize that each persons perspective of the various sounds will be different according to a particular persons position in the car and relation to the other person in the car. An audio representation of each persons' perspective can be created with different 3-D audio spatialization processing effects in the independent audio rendition managers.

Another example of implementing multiple audio rendition managers is to represent multiple cars with car engine sound effects to create an audio representation of the multiple cars passing a person at a fixed position. The perspective in a video game, for example, can be created with each audio rendition manager representing a rendition of a car. Each audio rendition manager can receive the information for the car engine sound effect from one segment in a performance manager.

File Format and Component Instantiation

Audio sources and audio generation systems having audio rendition managers can be pre-authored which makes it easy to develop complicated audio representations and generate music and sound effects without having to create and incorporate specific programming code for each instance of an audio rendition of a particular audio source. For example, audio rendition manager 206 (FIG. 4) and the associated audio data processing components can be instantiated from an audio rendition manager configuration data file (not shown).

A segment data file can also contain audio rendition manager configuration data within its file format representation to instantiate audio rendition manager 206. When a segment 414, for example, is loaded from a segment data file, the audio rendition manager 206 is created. Upon playback, the audio rendition manager 206 defined by the configuration data is automatically created and assigned to segment 414. When the audio corresponding to segment 414 is rendered, it releases the system resources allocated to instantiate audio rendition manager 206 and the associated components.

Configuration information for an audio rendition manager object, and the associated component objects for an audio generation system, is stored in a file format such as the Resource Interchange File Format (RIFF). A RIFF file includes a file header that contains data describing the object followed by what are known as "chunks." Each of the chunks following a file header corresponds to a data item that describes the object, and each chunk consists of a chunk header followed by actual chunk data. A chunk header specifies an object class identifier (CLSID) that can be used for creating an instance of the object. Chunk data consists of the data to define the corresponding data item. Those skilled in the art will recognize that an extensible markup language (XML) or other hierarchical file format can be used to implement the component objects and the audio generation systems described herein.

A RIFF file for a mapping component and a synthesizer component has configuration information that includes identifying the synthesizer technology designated by source input audio instructions. An audio source can be designed to play on more than one synthesis technology. For example, a hardware synthesizer can be designated by some audio instructions from a particular source, for performing certain musical instruments for example, while a wavetable synthesizer in software can be designated by the remaining audio instructions for the source.

The configuration information defines the synthesizer channels and includes both a synthesizer channel-to-buffer assignment list and a buffer configuration list stored in the synthesizer configuration data. The synthesizer channel-to-buffer assignment list defines the synthesizer channel sets and the audio buffers that are designated as the destination for audio wave data output from the synthesizer channels in the channel group. The assignment list associates audio buffers according to buffer global unique identifiers (GUIDs) which are defined in the buffer configuration list.

Defining the audio buffers by buffer GUIDs facilitates the synthesizer channel-to-buffer assignments to identify which buffer will receive audio wave data from a synthesizer channel. Defining buffers by buffer GUIDs also facilitates sharing resources such that more than one synthesizer can output audio wave data to the same buffer. When an audio buffer is instantiated for use by a first synthesizer, a second synthesizer can output audio wave data to the buffer if it is available to receive data input. The buffer configuration list also maintains flag indicators that indicate whether a particular buffer can be a shared resource or not.

The configuration information also includes a configuration list that contains the information to allocate and map audio instruction input channels to synthesizer channels. A particular RIFF file also has configuration information for a multi-bus component and an audio buffers component that includes data describing an audio buffer object in terms of a buffer GUID, a buffer descriptor, the buffer function and associated audio effects, and corresponding logical bus identifiers. The buffer GUID uniquely identifies each buffer and can be used to determine which synthesizer channels connect to which audio buffers. By using a unique buffer GUID for each buffer, different synthesizer channels, and channels from different synthesizers, can connect to the same buffer or uniquely different ones, whichever is preferred.

The instruction processors, mapping, synthesizer, multi-bus, and audio buffers component configurations support COM interfaces for reading and loading the configuration data from a file. To instantiate the components, an application program and/or a script file instantiates a component using a COM function. The components of the audio generation systems described herein can be implemented with COM technology and each component corresponds to an object class and has a corresponding object type identifier or CLSID (class identifier). A component object is an instance of a class and the instance is created from a CLSID using a COM function called CoCreateInstance. However, those skilled in the art will recognize that the audio generation systems and the various components described herein are not limited to a COM implementation, or to any other specific programming technique.

To create the component objects of an audio generation system, the application program calls a load method for an object and specifies a RIFF file stream. The object parses the RIFF file stream and extracts header information. When it reads individual chunks, it creates the object components, such as synthesizer channel group objects and corresponding synthesizer channel objects, and mapping channel blocks and corresponding mapping channel objects, based on the chunk header information.

A script file is a binary file in a RIFF file format that contains properties, or meta-information, about the script such as the language used to write the script, the script file version number, and similar script file information and properties. It also holds references to each piece of content, such as segments, audio content, or references to other content and/or scripts, used by the script, and the identifier labels by which the content will be referenced inside the script. The script file also includes a plain text file that maintains the source code for the script file.

Methods for Managing Audio Generation

Although the audio generation systems have been described above primarily in terms of their components and their characteristics, the audio generation systems also include methods performed by a computer or similar device to implement the features described above.

Figure 7:
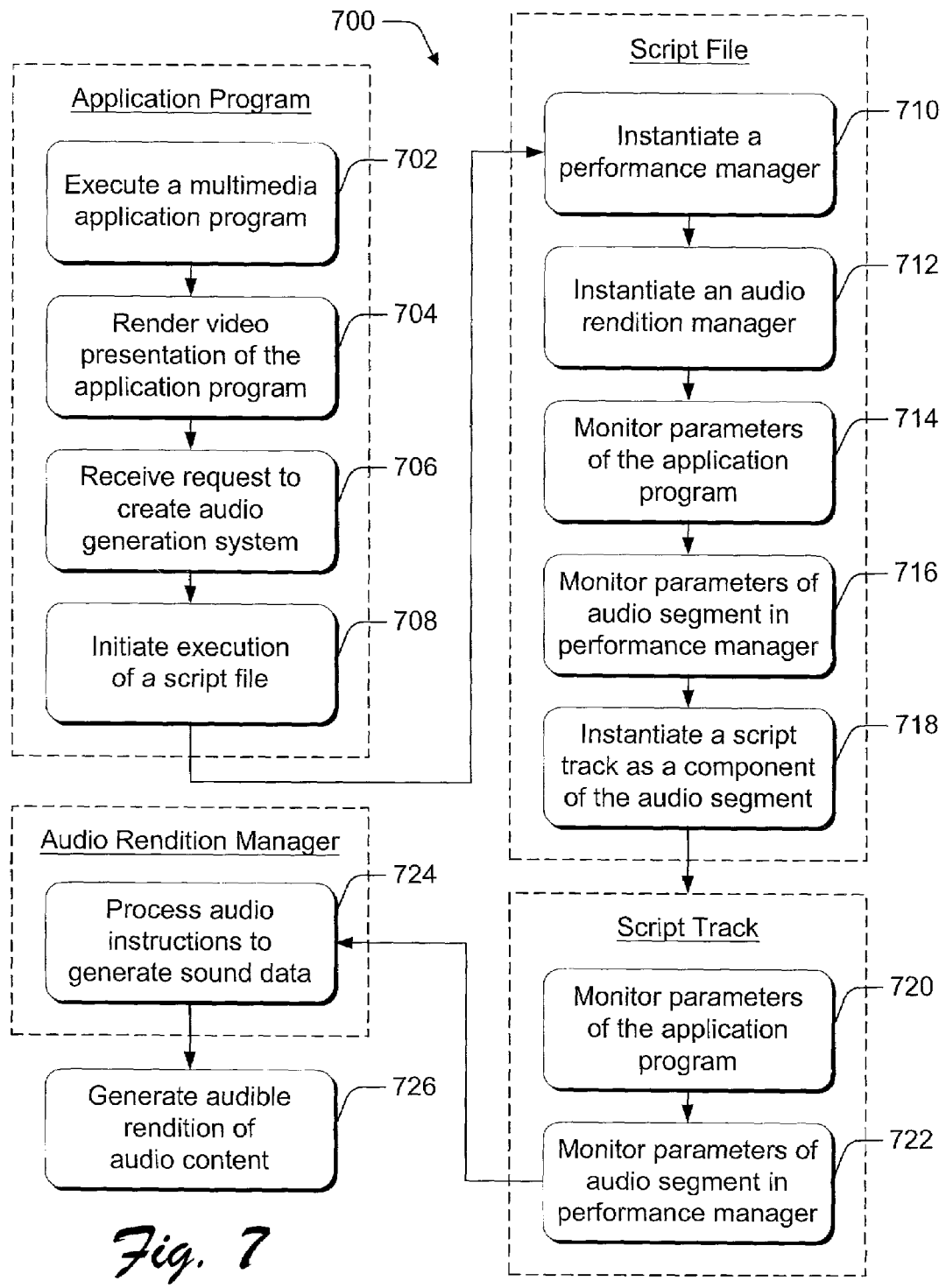
FIG. 7 is a flow diagram of a method for an audio generation system.

FIG. 7 illustrates a method 700 for managing audio generation and an audio generation system with script files. The method is illustrated as a set of operations shown as discrete blocks, and the order in which the method is described is not intended to be construed as a limitation. Furthermore, the method can be implemented in any suitable hardware, software, firmware, or combination thereof.

At block 702, a multimedia application program, such as an interactive video game program, is executed. At block 704, a video presentation of the application program is rendered, such as on a display device. At bock 706, a request is received from the application program to create an audio generation system to generate an audio rendition of a video event in the video presentation. At block 708, the application program initiates execution of a script file.

The script file, such as script file 300 for example (FIG. 3), includes a text section 302 that includes text labels to designate a point during execution of the script sequence when audio renditions of video events are to be generated. The script file also includes a container 304 that maintains audio content 310 within the script file, such as audio content 314 which is identified in the container with a content label 316 that corresponds to a text label in text section 302. The container 304 also maintains a reference 312 to additional audio content 332 that is not maintained as part of the script file. The reference 312 to the additional audio content is identified in the container with a reference label 330 that also corresponds to a text label in text section 302 of the script file.

At block 710, the script file instantiates a performance manager that includes at least one audio segment having one or more audio content components. For example, performance manager 204 (FIGS. 2 and 4) is instantiated as part of audio generation system 200 that produces an audio rendition to correlate with a video event. The audio content components, such as segment tracks 422, generate audio instructions from received audio content. Audio content is received from one or more audio sources 402 that provide digital samples of audio data such as from a wave file, message-based data such as from a MIDI file or a pre-authored segment file, or an audio sample such as a Downloadable Sound (DLS).

The performance manager 204 can be instantiated as a component object having an interface 208 that is callable by the application program 202, and have interface methods that are callable by the script file 218 via a translation interface between the script file and the performance manager. The translation interface can be implemented as an iDispatch application 220, for example.

At block 712, the script file instantiates an audio rendition manager that includes one or more audio rendering components for processing the audio instructions to render an audio rendition corresponding to the audio content. For example, audio rendition manager 206 (FIGS. 2 and 4) is instantiated as part of the audio generation system 200 that produces an audio rendition to correlate with a video event. Audio rendition manager 206 has audio rendering components that include a mapping component 440, a synthesizer component 442, a multi-bus component 444, and an audio buffers component 446.

The audio rendition manager can be instantiated as a component object having an interface 210 that is callable by the application program 202, and have interface methods that are callable by the script file 218 via the translation interface (e.g., iDispatch application 220) between the script file and the audio rendition manager.

At block 714, the script file monitors one or more parameters of the application program to determine when to input the audio content to the audio segment. Alternatively, or in addition, the script file monitors one or more parameters of the audio segment in the performance manager to determine when to input the audio content to the audio segment at block 716. Further, the audio segment can monitor the one or more parameters of the application program to determine when to call the script to input the audio content to the audio segment.

At block 718, the script file instantiates a script track as a component of the audio segment. Alternatively, the script track may be implemented in the audio segment when the audio segment is loaded. At block 720, the script track monitors one or more parameters of the application program to determine when to input the audio content to the audio segment. Alternatively, or in addition, the script track monitors one or more parameters of the audio segment in the performance manager to determine when to input the audio content to the audio segment at block 722.

At block 724, the audio instructions are processed by the audio rendering components of the audio rendition manager to generate audio sound wave data that represents an audio rendition corresponding to a video event. At block 726, the audio sound wave data is output from the audio rendering components and is routed to an external device to produce the audio rendition.

Audio Generation System Component Interfaces and Methods

Embodiments of the invention are described herein with emphasis on the functionality and interaction of the various components and objects. The following sections describe specific interfaces and interface methods that are supported by the various objects.

A Loader interface (IDirectMusicLoader8) is an object that gets other objects and loads audio rendition manager configuration information. It is generally one of the first objects created in a Direct® audio application. Direct® is an API available from Microsoft Corporation, Redmond Wash. The loader interface supports a LoadObjectFromFile method that is called to load all audio content, including DirectMusic® segment files, DLS (downloadable sounds) collections, MIDI files, and both mono and stereo wave files. It can also load data stored in resources. Component objects are loaded from a file or resource and incorporated into a performance. The Loader interface is used to manage the enumeration and loading of the objects, as well as to cache them so that they are not loaded more than once.

Audio Rendition Manager Interface and Methods

An AudioPath interface (IDirectMusicAudioPath8) represents the routing of audio data from a performance component to the various component objects that comprise an audio rendition manager. The AudioPath interface includes the following methods:

An Activate method is called to specify whether to activate or deactivate an audio rendition manager. The method accepts Boolean parameters that specify "TRUE" to activate, or "FALSE" to deactivate.

A ConvertPChannel method translates between an audio data channel in a segment component and the equivalent performance channel allocated in a performance manager for an audio rendition manager. The method accepts a value that specifies the audio data channel in the segment component, and an address of a variable that receives a designation of the performance channel.

A SetVolume method is called to set the audio volume on an audio rendition manager. The method accepts parameters that specify the attenuation level and a time over which the volume change takes place.

A GetObjectInPath method allows an application program to retrieve an interface for a component object in an audio rendition manager. The method accepts parameters that specify a performance channel to search, a representative location for the requested object in the logical path of the audio rendition manager, a CLSID (object class identifier), an index of the requested object within a list of matching objects, an identifier that specifies the requested interface of the object, and the address of a variable that receives a pointer to the requested interface.

The GetObjectInPath method is supported by various component objects of the audio generation system. The audio rendition manager, segment component, and audio buffers in the audio buffers component, for example, each support the getObject interface method that allows an application program to access and control the audio data processing component objects. The application program can get a pointer, or programming reference, to any interface (API) on any component object in the audio rendition manager while the audio data is being processed.

Real-time control of audio data processing components is needed, for example, to control an audio representation of a video game presentation when parameters that are influenced by interactivity with the video game change, such as a video entity's 3-D positioning in response to a change in a video game scene. Other examples include adjusting audio environment reverb in response to a change in a video game scene, or adjusting music transpose in response to a change in the emotional intensity of a video game scene.

Performance Manager Interface and Methods

A Performance interface (IDirectMusicPerformance8) represents a performance manager and the overall management of audio and music playback. The interface is used to add and remove synthesizers, map performance channels to synthesizers, play segments, dispatch event instructions and route them through event instructions, set audio parameters, and the like. The Performance interface includes the following methods:

A CreateAudioPath method is called to create an audio rendition manager object. The method accepts parameters that specify an address of an interface that represents the audio rendition manager configuration data, a Boolean value that specifies whether to activate the audio rendition manager when instantiated, and the address of a variable that receives an interface pointer for the audio rendition manager.

A CreateStandardAudioPath method allows an application program to instantiate predefined audio rendition managers rather than one defined in a source file. The method accepts parameters that specify the type of audio rendition manager to instantiate, the number of performance channels for audio data, a Boolean value that specifies whether to activate the audio rendition manager when instantiated, and the address of a variable that receives an interface pointer for the audio rendition manager.

A PlaySegmentEx method is called to play an instance of a segment on an audio rendition manager. The method accepts parameters that specify a particular segment to play, various flags, and an indication of when the segment instance should start playing. The flags indicate details about how the segment should relate to other segments and whether the segment should start immediately after the specified time or only on a specified type of time boundary. The method returns a memory pointer to the state object that is subsequently instantiated as a result of calling PlaySegmentEx.

A StopEx method is called to stop the playback of audio on an component object in an audio generation system, such as a segment or an audio rendition manager. The method accepts parameters that specify a pointer to an interface of the object to stop, a time at which to stop the object, and various flags that indicate whether the segment should be stopped on a specified type of time boundary.

Segment Component Interface and Methods

A Segment interface (IDirectMusicSegment8) represents a segment in a performance manager which is comprised of multiple tracks. The Segment interface includes the following methods:

A Download method to download audio data to a performance manager or to an audio rendition manager. The term "download" indicates reading audio data from a source into memory. The method accepts a parameter that specifies a pointer to an interface of the performance manager or audio rendition manager that receives the audio data.

An Unload method to unload audio data from a performance manager or an audio rendition manager. The term "unload" indicates releasing audio data memory back to the system resources. The method accepts a parameter that specifies a pointer to an interface of the performance manager or audio rendition manager.

A GetAudioPathConfig method retrieves an object that represents audio rendition manager configuration data embedded in a segment. The object retrieved can be passed to the CreateAudioPath method described above. The method accepts a parameter that specifies the address of a variable that receives a pointer to the interface of the audio rendition manager configuration object.

Script Interface and Methods

To create a script object from a script file, an application calls the Loader interface GetObject method which creates a script object via the COM CoCreateInstance and routes it via the IStream of the file to read. The script object reads the script as well as any embedded and linked content that is included as script content. The application utilizes the IDirectMusicScript interface that is returned to call routines and set variables. When the application has finished with the script, the application releases the script object.

Although the DirectMusic Loader loads each item embedded or referenced within a script, the script file has a flag for each item that indicates whether the item should be released from Loader when the script is released. By having Loader manage the content, multiple overlapping scripts can access the same content, whether it is embedded or linked. When an items are embedded, and if they have the same GUID, then only the first item loaded is used. A second script references to the first script's object, thereby saving memory. When the script is released, it calls Loader and tells it to relinquish all objects so that an application does not have make a separate call.

The IDirectMusicScript interface includes the following methods:

Init (pPerformance, pErrorInfo);
CallRoutine (pwszRoutineName, pErrorInfo);
SetVariableNumber (pwszVariableName, 1Value, pErrorInfo);
GetVariableNumber (pwszVariableName, p1Value, pErrorInfo);
SetVariableObject (pwszVariableName, punkValue, pErrorInfo);
GetVariableObject (pwszVariableName, ppunkValue, pErrorInfo);
SetVariableVariant (pwszVariableName, varValue, fSetRef, pErrorInfo);
GetVariableVariant (pwszVariableName, pvarValue, pErrorInfo);
EnumRoutine (DWORD dwIndex, WCHAR *pwszName);
EnumVariable (DWORD dwIndex, WCHAR *pwszName);

All of these methods except EnumRoutine and EnumVariable are passed an optional pointer pErrorInfo that receives information about any errors that occur within the script during the method call.

The Init method is called before the other methods are used, and pPerformance is used to assign a default performance object to the script. When the script calls functions such as AudioContent.Play, this is the performance that will play the sound corresponding to the audio content.

The CallRoutine method initiates a script to perform an action, and pwszRoutineName is the name of the subroutine within the script to execute a script. Script routines are called synchronously and system control does not return to the game engine until the routine finishes running.

The SetVariableNumber and GetVariableNumber methods provide communication between the game engine and the scripting environment, and any number of named 32-bit integer variables may be shared. A game (or multimedia application) programmer and composer determine variable semantics, and the game programmer can set variables that are read by scripts.

The SetVariableObject and GetVariableObject methods are utilized to share object variables which are references to an object such as a segment or another script. Both a script and an application program can call methods on such an object. For example, when a script loads a segment, it can save the returned object in a variable. Then both the game engine and the script can reference that variable. SetVariableObject is utilized to set a variable to reference a particular object, allowing the script to make use of that object at some time later, and pwszVariableName is the name of the variable and punkValue is a pointer to the object it will reference. GetVariableObject is utilized to retrieve a pointer to an object variable that was set by a script and this pointer is returned to ppunkValue.

The SetVariableVariant and GetVariableVariant methods utilized to communicate numbers and object variable types between a script and an application program. The methods allow signed and unsigned integers of different sizes, strings, arrays, dates, and currencies. When the SetVariable Variant method is called, a script variable identified as pwszVariableName is set to the value varValue. When the GetVariableVariant method is called, a script variable identified as pwszVariableName is returned through pvarValue.

The EnumRoutine and Enum Variable methods are utilized to determine the routines and variables that are contained within a script.

Exemplary Computing System and Environment

Figure 8:
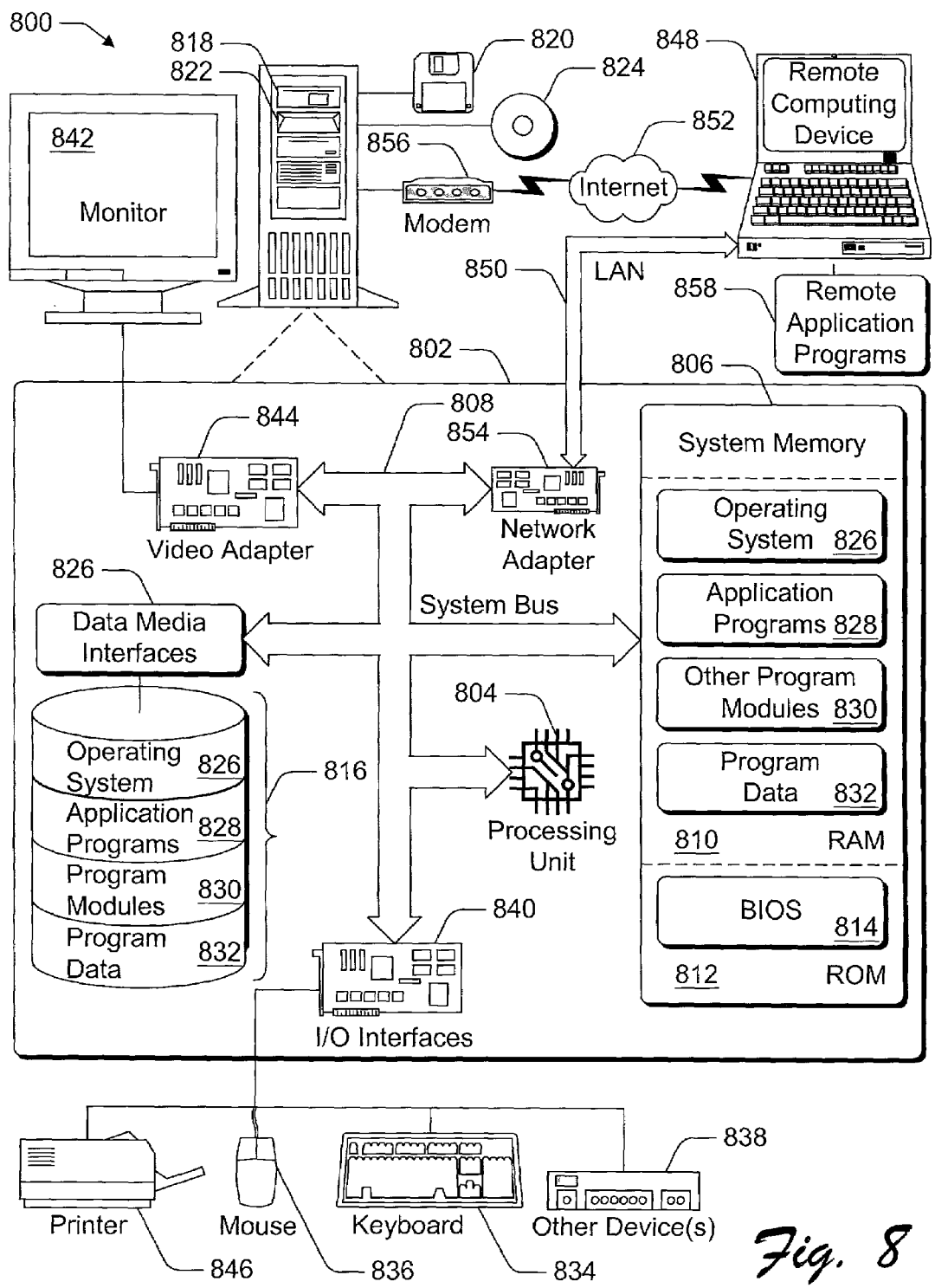
FIG. 8 is a diagram of computing systems, devices, and components in an environment that can be used to implement the systems and methods described herein.

FIG. 8 illustrates an example of a computing environment 800 within which the computer, network, and system architectures described herein can be either fully or partially implemented. Exemplary computing environment 800 is only one example of a computing system and is not intended to suggest any limitation as to the scope of use or functionality of the network architectures. Neither should the computing environment 800 be interpreted as having any dependency or requirement relating to any one or combination of components illustrated in the exemplary computing environment 800.

The computer and network architectures can be implemented with numerous other general purpose or special purpose computing system environments or configurations. Examples of well known computing systems, environments, and/or configurations that may be suitable for use include, but are not limited to, personal computers, server computers, thin clients, thick clients, hand-held or laptop devices, multiprocessor systems, microprocessor-based systems, set top boxes, programmable consumer electronics, network PCs, minicomputers, mainframe computers, gaming consoles, distributed computing environments that include any of the above systems or devices, and the like.

Audio generation may be described in the general context of computer-executable instructions, such as program modules, being executed by a computer. Generally, program modules include routines, programs, objects, components, data structures, etc. that perform particular tasks or implement particular abstract data types. Audio generation may also be practiced in distributed computing environments where tasks are performed by remote processing devices that are linked through a communications network. In a distributed computing environment, program modules may be located in both local and remote computer storage media including memory storage devices.

The computing environment 800 includes a general-purpose computing system in the form of a computer 802. The components of computer 802 can include, by are not limited to, one or more processors or processing units 804, a system memory 806, and a system bus 808 that couples various system components including the processor 804 to the system memory 806.

The system bus 808 represents one or more of any of several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Computer system 802 typically includes a variety of computer readable media. Such media can be any available media that is accessible by computer 802 and includes both volatile and non-volatile media, removable and non-removable media. The system memory 806 includes computer readable media in the form of volatile memory, such as random access memory (RAM) 810, and/or non-volatile memory, such as read only memory (ROM) 812. A basic input/output system (BIOS) 814, containing the basic routines that help to transfer information between elements within computer 802, such as during start-up, is stored in ROM 812. RAM 810 typically contains data and/or program modules that are immediately accessible to and/or presently operated on by the processing unit 804.

Computer 802 can also include other removable/non-removable, volatile/non-volatile computer storage media. By way of example, FIG. 8 illustrates a hard disk drive 816 for reading from and writing to a non-removable, non-volatile magnetic media (not shown), a magnetic disk drive 818 for reading from and writing to a removable, non-volatile magnetic disk 820 (e.g., a "floppy disk"), and an optical disk drive 822 for reading from and/or writing to a removable, non-volatile optical disk 824 such as a CD-ROM, DVD-ROM, or other optical media. The hard disk drive 816, magnetic disk drive 818, and optical disk drive 822 are each connected to the system bus 808 by one or more data media interfaces 826. Alternatively, the hard disk drive 816, magnetic disk drive 818, and optical disk drive 822 can be connected to the system bus 808 by a SCSI interface (not shown).

The disk drives and their associated computer-readable media provide non-volatile storage of computer readable instructions, data structures, program modules, and other data for computer 802. Although the example illustrates a hard disk 816, a removable magnetic disk 820, and a removable optical disk 824, it is to be appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the exemplary computing system and environment.

Any number of program modules can be stored on the hard disk 816, magnetic disk 820, optical disk 824, ROM 812, and/or RAM 810, including by way of example, an operating system 826, one or more application programs 828, other program modules 830, and program data 832. Each of such operating system 826, one or more application programs 828, other program modules 830, and program data 832 (or some combination thereof) may include an embodiment of an audio generation system.

Computer system 802 can include a variety of computer readable media identified as communication media. Communication media typically embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

A user can enter commands and information into computer system 802 via input devices such as a keyboard 834 and a pointing device 836 (e.g., a "mouse"). Other input devices 838 (not shown specifically) may include a microphone, joystick, game pad, satellite dish, serial port, scanner, and/or the like. These and other input devices are connected to the processing unit 804 via input/output interfaces 840 that are coupled to the system bus 808, but may be connected by other interface and bus structures, such as a parallel port, game port, or a universal serial bus (USB).

A monitor 842 or other type of display device can also be connected to the system bus 808 via an interface, such as a video adapter 844. In addition to the monitor 842, other output peripheral devices can include components such as speakers (not shown) and a printer 846 which can be connected to computer 802 via the input/output interfaces 840.

Computer 802 can operate in a networked environment using logical connections to one or more remote computers, such as a remote computing device 848. By way of example, the remote computing device 848 can be a personal computer, portable computer, a server, a router, a network computer, a peer device or other common network node, and the like. The remote computing device 848 is illustrated as a portable computer that can include many or all of the elements and features described herein relative to computer system 802.

Logical connections between computer 802 and the remote computer 848 are depicted as a local area network (LAN) 850 and a general wide area network (WAN) 852. Such networking environments are commonplace in offices, enterprise-wide computer networks, intranets, and the Internet. When implemented in a LAN networking environment, the computer 802 is connected to a local network 850 via a network interface or adapter 854. When implemented in a WAN networking environment, the computer 802 typically includes a modem 856 or other means for establishing communications over the wide network 852. The modem 856, which can be internal or external to computer 802, can be connected to the system bus 808 via the input/output interfaces 840 or other appropriate mechanisms. It is to be appreciated that the illustrated network connections are exemplary and that other means of establishing communication link(s) between the computers 802 and 848 can be employed.

In a networked environment, such as that illustrated with computing environment 800, program modules depicted relative to the computer 802, or portions thereof, may be stored in a remote memory storage device. By way of example, remote application programs 858 reside on a memory device of remote computer 848. For purposes of illustration, application programs and other executable program components, such as the operating system, are illustrated herein as discrete blocks, although it is recognized that such programs and components reside at various times in different storage components of the computer system 802, and are executed by the data processor(s) of the computer.

CONCLUSION

Portions of the systems and procedures described herein may be implemented in any combination of hardware, software, and/or firmware. For example, one or more application specific integrated circuits (ASICs) or programmable logic devices (PLDs) could be designed or programmed to implement one or more portions of the audio generation systems described herein.

Although the systems and methods have been described in language specific to structural features and/or procedures, it is to be understood that the invention defined in the appended claims is not necessarily limited to the specific features or procedures described. Rather, the specific features and procedures are disclosed as preferred forms of implementing the claimed invention.

The invention claimed is:

1. One or more computer readable media encoded with computer executable instructions that, when executed as a script file, direct a computing based audio generation system to:
    initiate an audio rendition of a video event when, during execution of a text section of the script file, a text label designates when to initiate the audio rendition from audio content maintained within the script file, the audio content being identified in the script file with a content label corresponding to the text label, where the audio content is auto-referable and generated as the audio rendition without a reference in the text section to identify a location of the audio content, and without an instruction in the text section to render the audio content; and
    instantiate one or more audio processing components of the computing based audio generation system that are configured to generate the audio rendition corresponding to the video event, an individual audio processing component having interface methods that are callable by the script file, the one or more audio processing components of the computing based audio generation system being instantiated as a synthesizer component to process audio instructions to generate streams of audio wave data, audio buffers to process the audio wave data, and logical buses that each correspond to one of the audio buffers, where each of the multiple streams of audio wave data are assigned to one or more of the logical buses such that a logical bus receives one or more of the streams of audio wave data from the synthesizer component and routes the streams of audio wave data to the corresponding audio buffer.

2. One or more computer readable media as recited in claim 1, wherein the audio content is generated as the audio rendition when a script processor executes the script file and determines that the content label corresponds to the text label.

3. One or more computer readable media as recited in claim 1, further encoded with computer executable instructions that, when executed, direct the computing-based audio generation system to initiate a second audio rendition when, during execution of the text section of the script file, a second text label designates when to initiate the second audio rendition from additional audio content maintained within the script file, the additional audio content being identified in the script file by a reference that is identified with a reference label corresponding to the second text label, where the additional audio content is auto-referable and generated as the second audio rendition during execution of the text section of the script file.

4. One or more computer readable media as recited in claim 3, wherein the additional audio content is generated as the second audio rendition when a script processor executes the script file and determines that the reference label corresponds to the second text label.

5. One or more computer readable media as recited in claim 1, further encoded with computer executable instructions that, when executed, direct the computing-based audio generation system to initiate a second audio rendition when, during execution of the text section of the script file, at least a second text label designates when to initiate the second audio rendition from additional audio content maintained within the script file, the additional audio content being identified in the script file with a second content label corresponding to the at least second text label; wherein
    the audio content is generated as the audio rendition when a script processor executes the script file and determines that the content label corresponds to the text label; and
    the additional audio content is generated as the second audio rendition when the script processor executes the script file and determines that the second content label corresponds to the at least second text label.

6. One or more computer readable media as recited in claim 1, wherein the interface methods of the individual audio processing component are callable by the script file via an iDispatch interface between the script file and the individual audio processing component.

7. One or more computer readable media as recited in claim 1, further encoded with computer executable instructions that, when executed, direct the computing-based audio generation system to:
    instantiate a performance manager that includes at least one audio segment having one or more audio content components, each audio content component configured to generate the audio instructions from the audio content; and
    instantiate an audio rendition manager that includes the one or more audio rendering components configured to process the audio instructions to render the audio rendition corresponding to the audio content.

8. One or more computer readable media as recited in claim 7, further encoded with computer executable instructions that, when executed, direct the computing-based audio generation system to instantiate the performance manager when an application program initiates execution of the script file, the performance manager being instantiated as a component object having an interface that is callable by the application program.

9. One or more computer readable media as recited in claim 7, further encoded with computer executable instructions that, when executed, direct the computing-based audio generation system to instantiate the performance manager as a component object having interface methods that are callable by the script file via a translation interface between the script file and the performance manager.

10. One or more computer readable media as recited in claim 9, wherein the translation interface is an iDispatch application.

11. One or more computer readable media as recited in claim 7, further encoded with computer executable instructions that, when executed, direct the computing-based audio generation system to instantiate the audio rendition manager when an application program initiates execution of the script file, the audio rendition manager being instantiated as a component object having an interface that is callable by the application program.

12. One or more computer readable media as recited in claim 7, further encoded with computer executable instructions that, when executed, direct the computing-based audio generation system to instantiate the audio rendition manager as a component object having interface methods that are callable by the script file via a translation interface between the script file and the audio rendition manager.

13. One or more computer readable media as recited in claim 12, wherein the translation interface is an iDispatch application.

14. One or more computer readable media as recited in claim 7, further encoded with computer executable instructions that, when executed, direct the computing-based audio generation system to monitor one or more parameters of the audio segment to determine when to input the audio content to the audio segment to render the audio content.

15. One or more computer readable media as recited in claim 7, further encoded with computer executable instructions that, when executed, direct the computing-based audio generation system to instantiate the performance manager when an application program initiates execution of the script file, and monitor one or more parameters of the application program to determine when to input the audio content to the audio segment to render the audio content.

16. One or more computer readable media as recited in claim 7, further encoded with computer executable instructions that, when executed, direct the computing-based audio generation system to instantiate a script track as a component of the audio segment, the script track configured to monitor one or more parameters of the audio segment to determine when to input the audio content to the audio segment to render the audio content.

17. One or more computer readable media as recited in claim 7, further encoded with computer executable instructions that, when executed, direct the computing-based audio generation system to instantiate the performance manager when an application program initiates execution of the script file, and instantiate a script track as a component of the audio segment, the script track configured to monitor one or more parameters of the application program to determine when to input the audio content to the audio segment to render the audio content.

18. A method for managing audio generation with a script file, comprising:
instantiating a performance manager that includes at least one audio segment having one or more audio content components, each audio content component generating audio instructions from received audio content; and
instantiating an audio rendition manager that includes one or more audio rendering components for processing the audio instructions to generate an audio rendition corresponding to the audio content, the one or more audio rendering components of the audio rendition manager including a synthesizer component to process the audio instructions to generate streams of audio wave data, audio buffers to process the audio wave data, and logical buses that each correspond to one of the audio buffers, where each of the multiple streams of audio wave data are assigned to one or more of the logical buses such that a logical bus receives one or more of the streams of audio wave data from the synthesizer component and routes the streams of audio wave data to the corresponding audio buffer.

19. A method for managing audio generation as recited in claim 18, wherein instantiating the performance manager is in response to an application program initiating execution of the script file.

20. A method for managing audio generation as recited in claim 19, wherein the performance manager is instantiated as a component object having an interface that is callable by the application program.

21. A method for managing audio generation as recited in claim 18, wherein the performance manager is instantiated as a component object having interface methods that are callable by the script file via a translation interface between the script file and the performance manager.

22. A method for managing audio generation as recited in claim 21, wherein the translation interface is an iDispatch application.

23. A method for managing audio generation as recited in claim 18, wherein instantiating the audio rendition manager is in response to an application program initiating execution of the script file.

24. A method for managing audio generation as recited in claim 23, wherein the audio rendition manager is instantiated as a component object having an interface that is callable by the application program.

25. A method for managing audio generation as recited in claim 18, wherein the audio rendition manager is instantiated as a component object having interface methods that are callable by the script file via a translation interface between the script file and the audio rendition manager.

26. A method for managing audio generation as recited in claim 25, wherein the translation interface is an iDispatch application.

27. A method for managing audio generation as recited in claim 18, wherein instantiating the performance manager is in response to an application program initiating execution of the script file, and the method further comprising monitoring one or more parameters of the application program to determine when to input the audio content to the audio segment.

28. A method for managing audio generation as recited in claim 18, further comprising monitoring one or more parameters of the audio segment to determine when to input the audio content to the audio segment.

29. A method for managing audio generation as recited in claim 18, further comprising instantiating a script track as a component of the audio segment, the script track monitoring one or more parameters of the audio segment to determine when to input the audio content to the audio segment.

30. A method for managing audio generation as recited in claim 18, wherein instantiating the performance manager is in response to an application program initiating execution of the script file, and the method further comprising instantiating a script track as a component of the audio segment, the script track monitoring one or more parameters of the application program to determine when to input the audio content to the audio segment.

31. One or more computer-readable media encoded with computer-executable instructions that, when executed, direct a computing system to perform the method of claim 18.

32. One or more computer-readable media encoded with computer-executable instructions that, when executed, direct a computing system to perform the method of claim 21.

33. One or more computer-readable media encoded with computer-executable instructions that, when executed, direct a computing system to perform the method of claim 25.

34. One or more computer-readable media encoded with computer-executable instructions that, when executed, direct a computing system to perform the method of claim 29.

35. One or more computer-readable media encoded with computer executable instructions that, when executed, direct a computing system to perform a method comprising:
 executing a multimedia application;
 rendering a video event of the multimedia application;
 receiving a request from the multimedia application to create an audio generation system to generate an audio rendition corresponding to the video event;
 in response to receiving the request, executing a script file to create the audio generation system, the script file comprising computer executable instructions that further direct the computing system to perform:
 instantiating a performance manager that includes at least one audio segment having one or more audio content components, each audio content component generating audio instructions from received audio content; and
 instantiating an audio rendition manager that includes one or more audio rendering components for processing the audio instructions to generate the audio rendition, the one or more audio rendering components of the audio rendition manager including a synthesizer component to process the audio instructions to generate streams of audio wave data, audio buffers to process the audio wave data, and logical buses that each correspond to one of the audio buffers, where each of the multiple streams of audio wave data are assigned to one or more of the logical buses such that a logical bus receives one or more of the streams of audio wave data from the synthesizer component and routes the streams of audio wave data to the corresponding audio buffer.

36. One or more computer-readable media as recited in claim 35, wherein the performance manager is instantiated as a component object having an interface that is callable by the script file.

37. One or more computer-readable media as recited in claim 35, wherein the performance manager is instantiated as a component object having interface methods that are callable by the script file via a translation interface between the script file and the performance manager.

38. One or more computer-readable media as recited in claim 35, wherein the audio rendition manager is instantiated as a component object having an interface that is callable by the script file.

39. One or more computer-readable media as recited in claim 35, wherein the audio rendition manager is instantiated as a component object having interface methods that are callable by the script file via a translation interface between the script file and the audio rendition manager.

40. One or more computer-readable media as recited in claim 35, wherein the script file further comprises computer executable instructions that further direct the computing system to perform instantiating a script track as a component of the audio segment, the script track monitoring one or more parameters of the audio segment to determine when to input the received audio content to the audio segment.

41. One or more computer-readable media as recited in claim 35, wherein the script file further comprises computer executable instructions that further direct the computing system to perform instantiating a script track as a component of the audio segment, the script track monitoring one or more parameters of the multimedia application to determine when to input the received audio content to the audio segment.

42. One or more computer readable media encoded with computer executable instructions that, when executed as a script file, direct an audio generation system to:
 instantiate a performance manager that includes at least one audio segment having one or more audio content components, each audio content component configured to generate audio instructions from received audio content; and
 instantiate an audio rendition manager that includes one or more audio rendering components configured to process the audio instructions to generate an audio rendition corresponding to the audio content, the one or more audio rendering components of the audio rendition manager including a synthesizer component to process the audio instructions to generate streams of audio wave data, audio buffers to process the audio wave data, and logical buses that each correspond to one of the audio buffers, where each of the multiple streams of audio wave data are assigned to one or more of the logical buses such that a logical bus receives one or more of the streams of audio wave data from the synthesizer component and routes the streams of audio wave data to the corresponding audio buffer.

43. One or more computer readable media as recited in claim 42, further encoded with computer executable instructions that, when executed, direct the audio generation system to instantiate the performance manager and the audio rendition manager when an application program initiates execution of the script file, the performance manager being instantiated as a component object having an interface that is callable by the application program, and the audio rendition manager being instantiated as a component object having an interface that is callable by the application program.

44. One or more computer readable media as recited in claim 42, further encoded with computer executable instructions that, when executed, direct the audio generation system to instantiate the performance manager as a component object having interface methods that are callable by the script file via a translation interface between the script file and the performance manager, and to instantiate the audio rendition manager as a component object having interface methods that are callable by the script file via the translation interface between the script file and the audio rendition manager.

45. One or more computer readable media as recited in claim 42, further encoded with computer executable instructions that, when executed, direct the audio generation system to determine when to input the audio content to the audio segment to generate the audio rendition.

46. One or more computer readable media as recited in claim 42, further encoded with computer executable instructions that, when executed, direct the audio generation system to instantiate a script track as a component of the audio segment, the script track configured to monitor one or more parameters of the audio segment to determine when to input the audio content to the audio segment to generate the audio rendition.

47. One or more computer readable media as recited in claim 42, further encoded with computer executable instructions that, when executed, direct the audio generation system to instantiate the performance manager and the audio rendition manager when an application program initiates execution of the script file, and to instantiate a script track as a component of the audio segment, the script track configured to monitor one or more parameters of the application program to determine when to input the audio content to the audio segment to generate the audio rendition.

* * * * *